(12) United States Patent
Hong et al.

(10) Patent No.: US 12,629,829 B2
(45) Date of Patent: May 19, 2026

(54) APPARATUS AND METHOD FOR SELF-SUPERVISED LEARNING FOR VISUAL FEATURE REPRESENTATION OF EGOCENTRIC IMAGES

(71) Applicant: SAMSUNG ELECTRONICS CO., LTD., Suwon-si (KR)

(72) Inventors: Jungseok Hong, Minneapolis, MN (US); Suveer Garg, New York, NY (US); Jinwook Huh, Millburn, NJ (US); Hyun Soo Park, Saint Paul, MN (US); Ibrahim Volkan Isler, Saint Paul, MN (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 364 days.

(21) Appl. No.: 18/114,834

(22) Filed: Feb. 27, 2023

(65) Prior Publication Data

US 2024/0286283 A1 Aug. 29, 2024

Related U.S. Application Data

(60) Provisional application No. 63/315,439, filed on Mar. 1, 2022.

(51) Int. Cl.
B25J 9/00 (2006.01)
B25J 9/16 (2006.01)
(Continued)

(52) U.S. Cl.
CPC .......... B25J 9/1664 (2013.01); B25J 9/1697 (2013.01); G06T 7/70 (2017.01); G06V 10/44 (2022.01);
(Continued)

(58) Field of Classification Search
None
See application file for complete search history.

(56) References Cited

U.S. PATENT DOCUMENTS 8,948,471 B2 * 2/2015 Fichtinger ............ A61N 5/1014
600/407
2011/0262003 A1 * 10/2011 Woo ..................... G06V 10/757
382/103
(Continued)

FOREIGN PATENT DOCUMENTS

JP 2003-117867 A 4/2003
JP 2003-211381 A 7/2003
(Continued)

OTHER PUBLICATIONS

International Search Report (PCT/ISA/210) and Written Opinion (PCT/ISA/237) issued by the International Searching Authority on Jun. 2, 2023 in corresponding International Application No. PCT/KR2023/002814.

*Primary Examiner* — Truc M Do
(74) *Attorney, Agent, or Firm* — Sughrue Mion, PLLC

(57) ABSTRACT

An electronic device for manipulating a target object, including: a camera; a memory; and at least one processor configured to: obtain a first image of the target object, wherein the first image is captured by the camera, provide the first image and a target image to an artificial intelligence (AI) model to obtain relative pose information, based on the obtained relative pose information, generate a similarity value, and generate a control command based on the similarity value, wherein based on the similarity value being greater than a threshold value, the control command includes a movement command for moving a manipulator associated with the electronic device from a first position to a second position, and wherein based on the similarity value being less than or equal to the threshold value, the control
(Continued)

command includes a manipulation command for manipulating the target object using the manipulator.

19 Claims, 22 Drawing Sheets

(51) Int. Cl.
| | | |
|---|---|---|
| *G06T 7/70* | (2017.01) | |
| *G06V 10/44* | (2022.01) | |
| *G06V 10/74* | (2022.01) | |

(52) U.S. Cl.
CPC .. *G06V 10/761* (2022.01); *G06T 2207/30241* (2013.01)

(56) References Cited

U.S. PATENT DOCUMENTS

| | | | | |
|---|---|---|---|---|
| 2014/0067317 | A1* | 3/2014 | Kobayashi | G05D 3/00 |
| | | | | 702/153 |
| 2014/0233800 | A1* | 8/2014 | Kis | G06V 20/46 |
| | | | | 382/103 |
| 2016/0155235 | A1* | 6/2016 | Miyatani | G06T 7/521 |
| | | | | 382/103 |
| 2017/0061626 | A1* | 3/2017 | Otake | G06V 10/70 |
| 2018/0126553 | A1* | 5/2018 | Corkum | B25J 9/1697 |
| 2019/0084151 | A1* | 3/2019 | Bai | B25J 9/1697 |
| 2019/0099891 | A1* | 4/2019 | Tomioka | B25J 9/1697 |
| 2019/0152054 | A1 | 5/2019 | Ishikawa et al. | |
| 2019/0299405 | A1 | 10/2019 | Warashina et al. | |
| 2020/0061811 | A1 | 2/2020 | Iqbal et al. | |
| 2020/0238530 | A1 | 7/2020 | Kumagai et al. | |
| 2021/0326754 | A1* | 10/2021 | Suzuki | G06N 3/08 |
| 2022/0172386 | A1 | 6/2022 | Liu et al. | |
| 2022/0343537 | A1* | 10/2022 | Taamazyan | G06V 10/82 |

FOREIGN PATENT DOCUMENTS

| | | | |
|---|---|---|---|
| JP | 2015-145050 | A | 8/2015 |
| JP | 2019-93461 | A | 6/2019 |
| JP | 2021-109291 | A | 8/2021 |
| WO | 2022-104178 | A1 | 5/2022 |

* cited by examiner

Figure 3A:
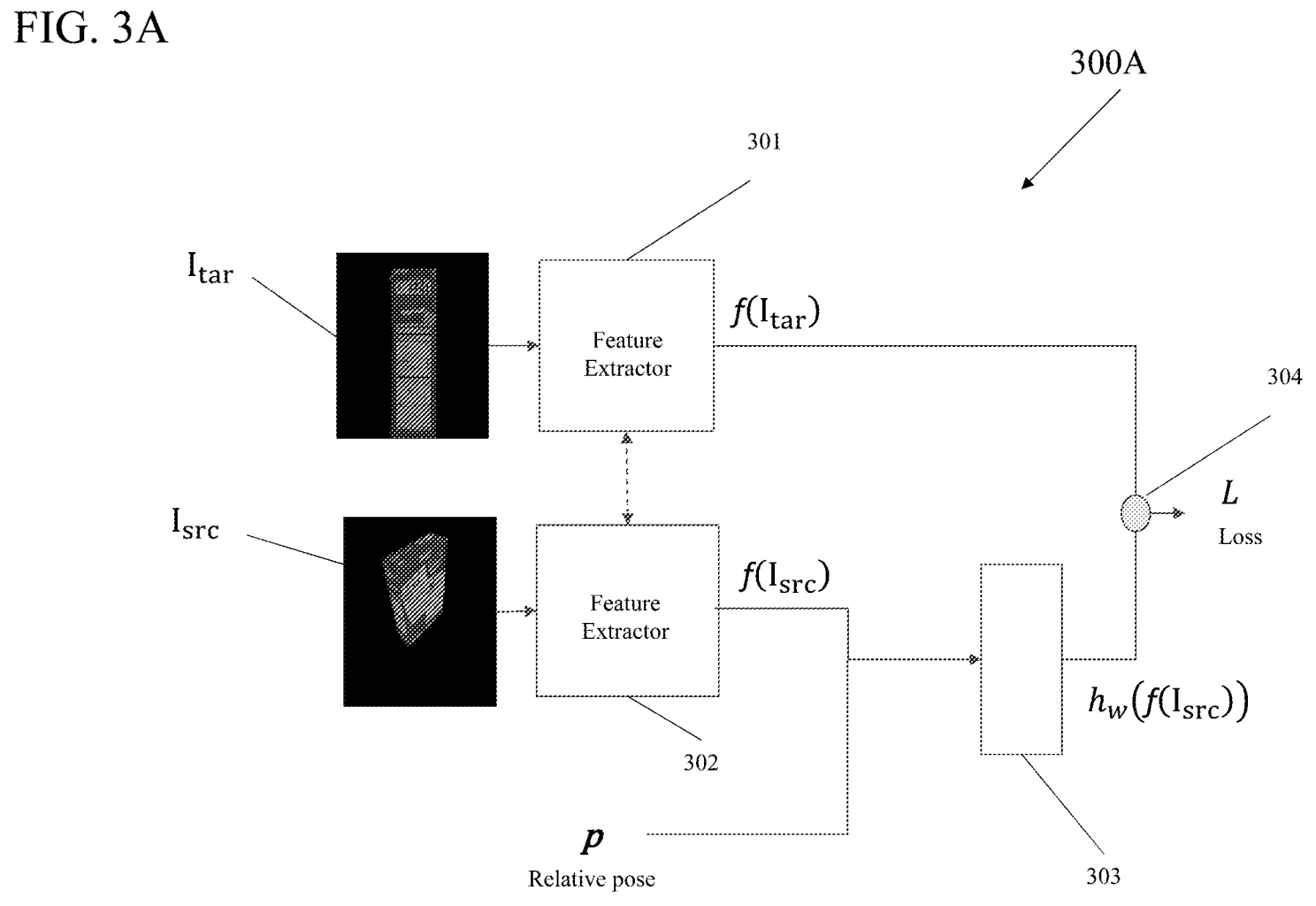

$f(\mathrm{I_{tar}})$

Feature Extractor $\mathrm{I_{tar}}$

302

$f(\mathrm{I_{src}})$

Feature Extractor $\mathrm{I_{src}}$

303

$h_w(f(\mathrm{I_{src}}))$

304

$L$

Loss $\boldsymbol{p}$

Relative pose

700B

Input image

Segmenting input image

711

Extracting object mask

712

Source image

700C

700E

781 — Approaching target object

782 — Manipulating target object

807 — Moving manipulator

806 — Generating movement command

801 — Obtaining image

802 — Obtaining relative pose information

803 — Generating similarity value

804 — Similarity value greater than threshold similarity value?

NO

YES

805 — Generating manipulation command

800

APPARATUS AND METHOD FOR SELF-SUPERVISED LEARNING FOR VISUAL FEATURE REPRESENTATION OF EGOCENTRIC IMAGES

CROSS-REFERENCE TO RELATED APPLICATION

This application is based on and claims priority under 35 U.S.C. § 119 from U.S. Provisional Application No. 63/315,439 filed on Mar. 1, 2022, in the U.S. Patent & Trademark Office, the disclosure of which is incorporated by reference herein in its entirety.

BACKGROUND

1. Field

The disclosure relates to vision-based robot control, and more particularly, controlling robot movement and object manipulation using self-supervised visual servoing.

2. Description of Related Art

Despite many advances in robotic manipulation, manipulating general objects in unstructured environments remains challenging. Using vision-based robot control, which may be referred to as visual servoing, a robot may perform movements based on images captured by the robot, or images of the robot. For example, a vision sensor corresponding to the robot may capture a source image, and the robot may be moved until the source image converges to a target image, which may correspond to a desired endpoint of the movements.

Some approaches to visual servoing depend on local image feature mapping. Such approaches may be relatively accurate locally, but may become much less accurate as the size of movements increase, or as multiple movements are performed. For example, the accuracy of these approaches may decrease because large or extended motions may result in occlusions in the image or significant changes in image features, or because smaller errors may compound into larger errors as large or extended movements are performed. In addition, these approaches may be unable to properly operate when the source image and the target image do not share a sufficient number of common features.

Other approaches to visual servoing depend on regressing an absolute pose of the vision sensor with respect to a pre-defined coordinate system corresponding to an object such as a target of manipulation by the robot. However, these approaches may require 3-dimensional (3D) supervision of a spatial relationship between the vision sensor and the pre-defined coordinate system. For example, the pre-defined coordinate system must be labeled using ground truth data such as a 3D bounding box or mesh. However, it may be difficult to obtain such ground truth data for generalized objects.

Another approach uses deep learning regression to estimate a relative orientation between two depth images. However, because this approach can only estimate the orientation within approximately 30 degrees, it may be difficult to apply for a wide range of applications.

Another approach uses a convolutional neural network (CNN)-based visual servoing system. This approach may iteratively regress a relative pose from a current image to a given reference image. The CNN may be trained in a supervised manner for regression of the relative pose between two input images.

Yet another approach uses an autoencoder network to learn a low-dimensional embedding space and perform visual servoing in the latent space. However, this approach may use generated images from only one scene or few scenes on the plane surface.

Still further approaches use reinforcement learning (RL) methods. These RL approaches may learn an inverse model from collected image-action sequences, and then the trained inverse model may predict action for given consecutive images. However, the performance of these approaches may be degraded drastically if the input image is from out-of-distribution. In addition, these RL approaches may generate an action based on several consecutive visual inputs, and it may therefore be difficult to generate an entire sequence of trajectories to the target image.

SUMMARY

In accordance with an aspect of the disclosure, there is provided an electronic device for manipulating a target object, the electronic device including: a camera; a memory; at least one processor configured to: obtain a first image of the target object, wherein the first image is captured by the camera, provide the first image and a target image to an artificial intelligence (AI) model to obtain relative pose information about the first image with respect to the target image wherein the target image is a pre-trained image stored in the memory for manipulating the target object at the electronic device, based on the obtained relative pose information, generate a similarity value representing a similarity between the first image and the target image, and generate a control command based on the similarity value, wherein based on the similarity value being less than or equal to a threshold value, the control command includes a movement command for moving a manipulator associated with the electronic device from a first position to a second position, and wherein based on the similarity value being greater than the threshold value, the control command includes a manipulation command for manipulating the target object using the manipulator.

In accordance with an aspect of the disclosure, there is provided a method of manipulating a target object, the method being executed by at least one processor and including: obtaining a first image of the target object, wherein the first image is captured by a camera, providing the first image and a target image to an artificial intelligence (AI) model to obtain relative pose information about the first image with respect to the target image wherein the target image is a pre-trained image for manipulating the target object, based on the obtained relative pose information, generating a similarity value representing a similarity between the first image and the target image, and generating a control command based on the similarity value, wherein based on the similarity value being less than or equal to a threshold value, the control command includes a movement command for moving a manipulator from a first position to a second position, and wherein based on the similarity value being greater than the threshold value, the control command includes a manipulation command for manipulating the target object using the manipulator.

In accordance with an aspect of the disclosure, there is provided a non-transitory computer-readable medium configured to store instructions which, when executed by at least one processor of a device for manipulating a target object, cause the at least one processor to: obtain a first image of the target object, wherein the first image is captured by a camera, provide the first image and a target image to an artificial intelligence (AI) model to obtain relative pose information about the first image with respect to the target image wherein the target image is a pre-trained image for manipulating the target object, based on the obtained relative pose information, generate a similarity value representing a similarity between the first image and the target image, and generate a control command based on the similarity value, wherein based on the similarity value being less than or equal to a threshold value, the control command includes a movement command for moving a manipulator from a first position to a second position, and wherein based on the similarity value being greater than the threshold value, the control command includes a manipulation command for manipulating the target object using the manipulator.

BRIEF DESCRIPTION OF THE DRAWINGS

The above and other aspects, features, and advantages of embodiments of the disclosure will be more apparent from the following description taken in conjunction with the accompanying drawings, in which:

FIGS. 3A-3C are block diagrams illustrating examples of relative pose neural networks, according to embodiments.

DETAILED DESCRIPTION

Figure 1A:
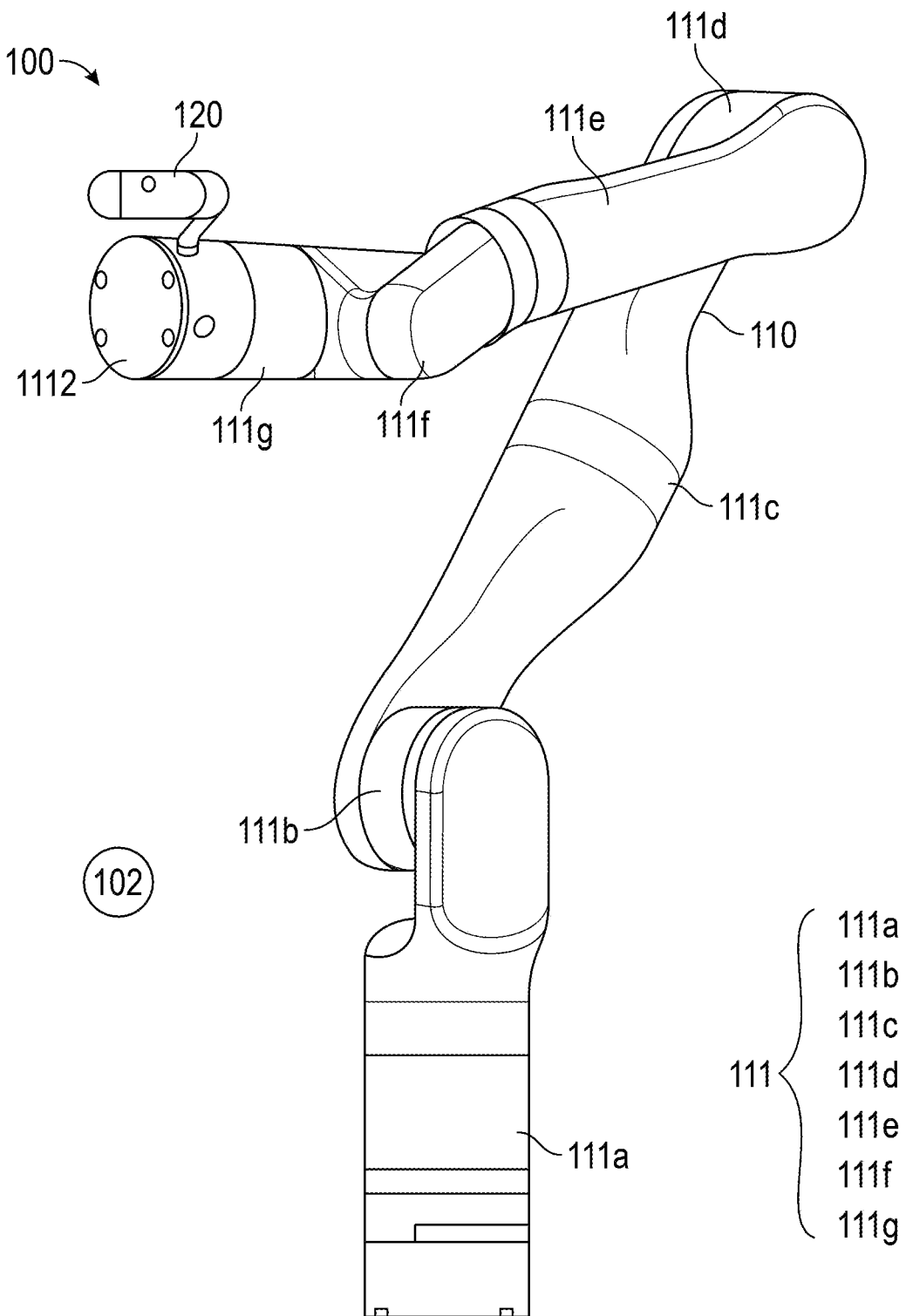
FIGS. 1A-1B are block diagrams of a configuration of a trajectory estimating system, in accordance with embodiments.

Embodiments of the present disclosure provide an artificial intelligence (AI)-based tool trajectory estimating apparatus and an operating method thereof.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

In the present specification, an 'image' may denote a still image, a plurality of consecutive still images, or a moving image.

Further, in the present specification, a neural network is a representative example of an artificial intelligence model, but embodiments are not limited to an artificial intelligence model using an algorithm.

Furthermore, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c, or variations thereof.

Embodiments may relate to a self-supervised learning method for performing wide baseline visual servoing. Given an initial source image, embodiments may predict relative transformations from the source image to a target image, even in situations in which the visual appearance of the target image is significantly different from the source image, and may control a tool such as a robot arm to move according to the predicted transformations.

Specifically, embodiments may relate to a self-supervised visual servoing method for wide baseline transformations without 3-dimensional (3D) supervision. Embodiments may be similar to human perception, in that object transformations may be learned during movements without 3D ground truth.

For example, embodiments may rely on 3D equivariance, which may refer to a geometric property of a visual representation which is transformed as a function of a 3D transformation. For example, according to 3D equivariance, when an object is translated from one location to another, a visual representation of the object may undergo the transformation that accounts for the translation. Embodiments may enforce 3D equivariance during visual servoing using a Siamese neural network architecture, which may refer to a neural network architecture that contains two or more identical subnetworks, for example two or more subnetworks which may have the same configuration with the same neural network parameters, for example the same weights.

Embodiments may use pairs of source images and target images and their relative transformations to learn a coherent visual representation. To avoid a trivial solution, embodiments may integrate a geodesic preserving property into representation learning in conjunction with 3D equivariance. Using the learned representation, embodiments may formulate the problem of estimating the optimal transformation as one which may best explain the feature transformation. Accordingly, embodiments may cast the visual servoing problem as a feature mapping problem, and visual servoing may be performed directly in the learned feature space.

Embodiments may use 3D relative egomotion as a supervisionary signal to learn the visual representation. This type of supervision differs from 3D object supervision, which requires a 3D ground truth to be known. In visual servoing, obtaining a 3D ground truth for 3D object supervision may require both a 3D representation, for example from 3D computer-aided design (CAD) models or 3D reconstruction, and also a visual alignment with images. This alignment is often conducted by manual annotation or sophisticated capture systems.

In contrast, embodiments may determine 3D relative egomotion based on information about the movement of a robot, for example motor encoder readings which reflect joint angles of the robot's joints, which may be readily generalizable to a new set of objects. Therefore, embodiments may be self-supervising, in that learning may be performed without human input such as labeling object coordinates or providing 3D object bounding boxes or meshes. Accordingly, embodiments may estimate a relative pose, for example a relative pose of the robot or a relative pose of a vision sensor, instead of an absolute pose. In addition, embodiments may converge to the target image without local feature mapping.

Therefore, embodiments may provide: 1) self-supervised learning for visual feature representation and equivariance feature transformation; 2) estimation of relative transformation for the target image with respect to a current camera coordinate frame using backpropagation; and 3) an improved servoing method which may handle large changes in target object appearance.

Figure 1B:
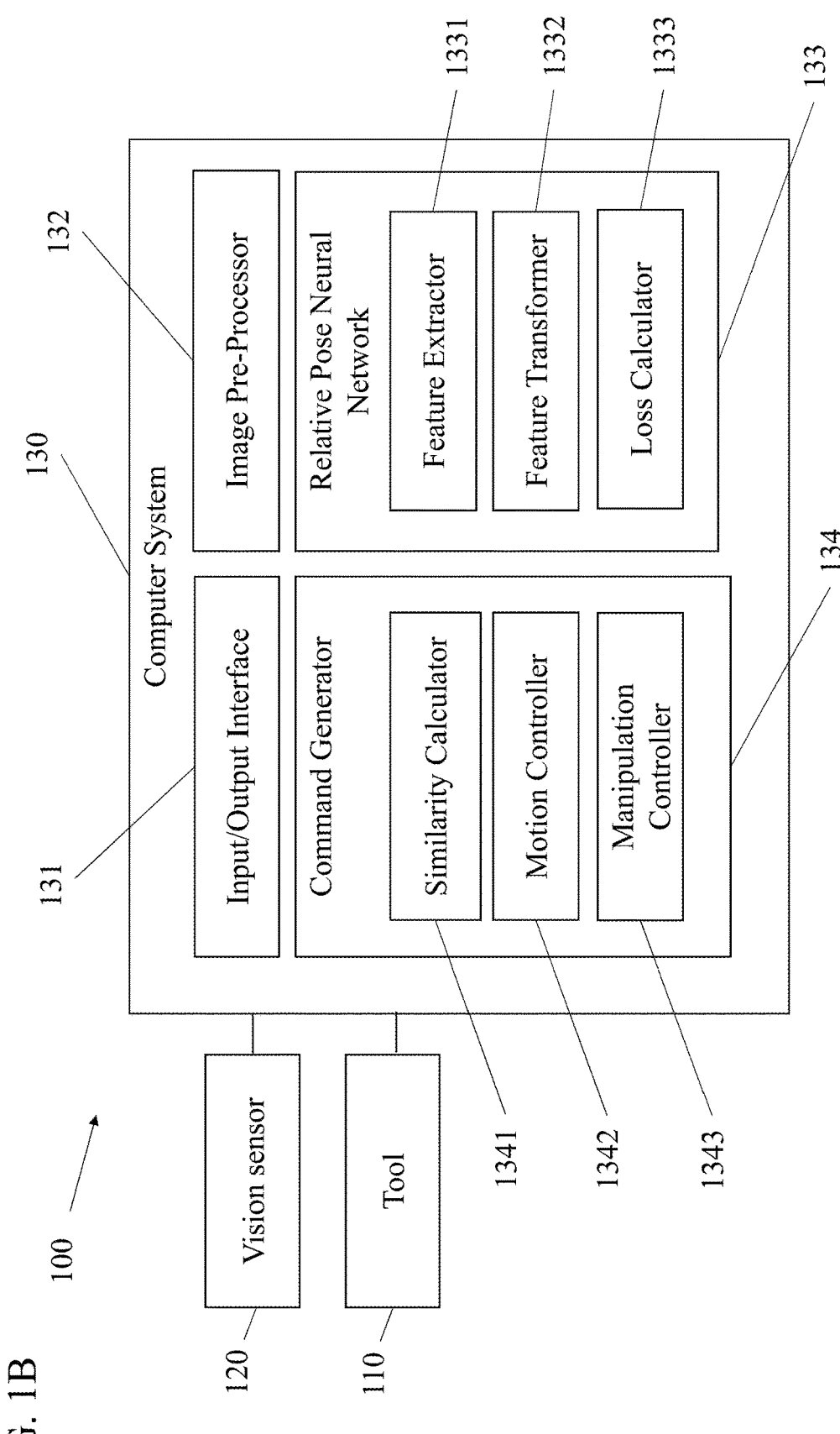

FIGS. 1A-1B are block diagrams of a configuration of a trajectory estimating system, in accordance with embodiments.

As shown in FIGS. 1A and 1B, an apparatus 100 according to embodiments may include a tool 110, a vision sensor 120, and a computer system 130. The computer system 130 may include an input/output interface 131, an image pre-processor 132, a relative pose neural network 133, and a command generator 134. In embodiments, the relative pose neural network 133 may include a feature extractor 1331, a feature transformer 1332, and a loss calculator 1333. In embodiments, the command generator 134 may include a similarity calculator 1341, a motion controller 1342, and a manipulation controller 1343.

The apparatus 100 may receive a task to be performed on a target object 102, and may estimate a movement path (i.e., trajectory) of the tool 110 to perform the task. For example, the apparatus 100 may train the relative pose neural network 133 that accepts as input source image of the target object 102 and generates as output an estimated relative pose of the tool 110, for example an estimated relative pose of the vision sensor 120 with respect to the target object 102. The estimated relative pose may then be used by the command generator 134 to generate a command for controlling the tool

6

110. In embodiments, the relative pose neural network 133 may be trained to minimize a loss function that is calculated by the loss calculator 1333 to measure the similarity between features obtained from a target image, and features obtained from a source image that is transformed based on the relative pose.

Hereinafter, the elements of the apparatus 100 are described in further detail.

The tool 110 may be operated under the control of the computer system 130 to manipulate the target object 102. In embodiments, the tool 110 may be a robot arm having a manipulator 112 positioned at one end thereof. The manipulator 112 may include a device such as an end-effector for interacting with the target object 102. Examples of the end effector may include grippers, scoops, tweezers, force-torque sensors, material removal tools, welding torches, collision sensors, and tool changers, and the types of the end effector are not limited thereto. Examples of the target object 102 to be manipulated by the tool 110 may include a hook, a cup, a container, a bag, and the like. For example, when a gripper of a robot arm is used as the manipulator 112, the manipulation controller 1343 may control the gripper to grasp the target object 102.

In embodiments, the tool 110 may include one or more joints 111. For example, the joints 111 may include a joint 111a, a joint 111b, a joint 111c, a joint 111d, a joint 111e, a joint 111f, and a joint 111g, each of which may be located at different positions along the tool 110. In embodiments, the tool 110 may move the manipulator 112 to a desired position in space by rotating, moving, or otherwise operating at least one of the joints 111. For example, the motion controller 1342 may compute joint angles for the joints 111 which may cause the vision sensor 120 to be placed at a particular position, and the tool may rotate the joints 111 according to the calculated joint angles. In embodiments, the particular position may be a position corresponding to the target image. For example, when a gripper of a robot arm is used as the manipulator 112, the particular position may be position that is suitable for grasping the target object 102 by the gripper.

The vision sensor 120 may include one or more cameras, and may be configured to capture images of at least one of the tool 110 and the target object 102. In embodiments, the vision sensor 120 may be used to capture images which may indicate a relative position of the tool 110 or the manipulator 112 with respect to the target object 102. For example, in embodiments the vision sensor 120 may be attached to the robot arm such that the vision sensor 120 is located at a fixed position with respect to the manipulator 112, and therefore the vision sensor 120 may be moved by the robot arm along with the manipulator 112 according to the movements of the joints 111. Accordingly, the vision sensor 120 may capture a source image of the target object 102, and because a position of the vision sensor 120 with respect to the manipulator 112 may be known, the computer system 130 may use the source image to determine a relative position of the manipulator 112 with respect to the target object 102. The vision sensor 120 may be implemented as one or more red/green/blue (RGB) cameras, however embodiments are not limited thereto.

The image pre-processor 132 may perform pre-processing on an image of the target object 102. Specifically, the image pre-processor 132 may receive the image from the vision sensor 120 via the input/output interface 131. The image pre-processor 132 may generate a foreground mask of the image. In particular, the image pre-processor 132 may identify the location of the target object 102 in the image, and may set pixel values of the image to zero, except the area of the target object 102 in the image. For example, the image pre-processor 132 may segment the target object 102 from the rest of the image using a separate convolutional neural network (CNN), to acquire the foreground mask. The image pre-processor 132 may apply the foreground mask to the image, to output a masked image. In embodiments, the masked image may be, for example, the source image of the target object 102, and the relative pose neural network 133 may estimate the relative pose based on the masked image.

The input/output interface 131 may enable communications between the tool 110, the vision sensor 120, and the computer system 130. The input/output interface 131 may include a transceiver and/or a separate receiver and transmitter that enables the computer system 130 to communicate with other devices, such as via a wired connection, a wireless connection, or a combination of wired and wireless connections. The input/output interface 131 may permit the computer system 130 to receive information from another device and/or provide information to another device. For example, the input/output interface 131 may include an Ethernet interface, an optical interface, a coaxial interface, an infrared interface, a radio frequency (RF) interface, a universal serial bus (USB) interface, a Wi-Fi interface, a cellular network interface, or the like. In embodiments, the computer system 130 may be included in another element such as the tool 110 or the manipulator 112, or may be separate from and external to the other elements of the apparatus 100.

The image pre-processor 132, the relative pose neural network 133, and the command generator 134 may be implemented by at least one processor and at least one memory.

The processor is implemented in hardware, firmware, or a combination of hardware and software. The processor may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor may include one or more processors capable of being programmed to perform a function. The processor may access the memory and execute computer readable program instructions that are stored in the memory.

The memory may store information, data, an operating system, a plurality of program modules related to the operation and use of the apparatus 100. For example, the memory may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The memory may include program instructions and codes configured to be executed by the processor to perform the operations of the image pre-processor 132, the relative pose neural network 133, and the command generator 134.

Figure 2:
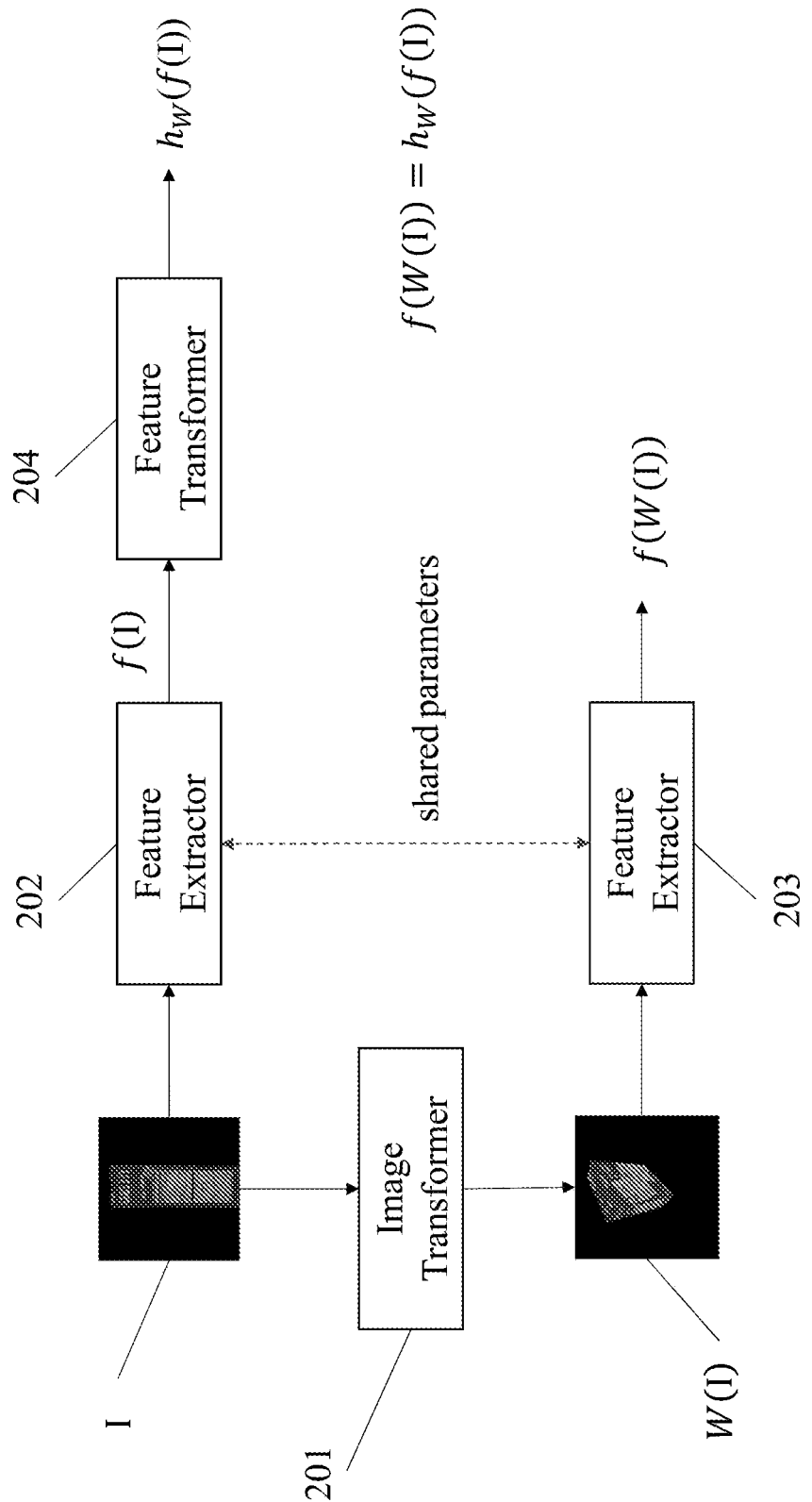
FIG. 2 is a diagram for explaining an example of 3D equivariance, in accordance with embodiments.

FIG. 2 is a diagram for explaining an example of 3D equivariance, in accordance with embodiments. In embodiments, a neural network may be 3D equivariant if a transformation of the input to the network results in a transformation of the output of the network. For example, consider an image transformer 201 which may apply a transformation W to an image I to obtain a transformed image W(I). Further, consider a feature extractor 202 and a feature extractor 203 which may have shared neural network parameters or weights, as indicated by the dashed line in FIG. 2. The feature extractor 202 may be used to extract features f(I) from the input image I, and the feature extractor 203 may be used to extract features f(W(I)) from the transformed image W(I). In addition, a feature transformer 204 may apply a feature transformation $h_W$ to the features f(I) to obtain transformed features $h_W(f(I))$. In embodiments, the feature extractor 202 and the feature extractor 203 may be referred to as 3D equivariant if the features f(W(I)) of the transformed image W(I) are identical to the transformed features $h_W f(I)$ of the image I, as expressed in Equation 1 below:

$$f(W(I)) = h_W(f(I)) \qquad \text{(Equation 1)}$$

Figure 3B:
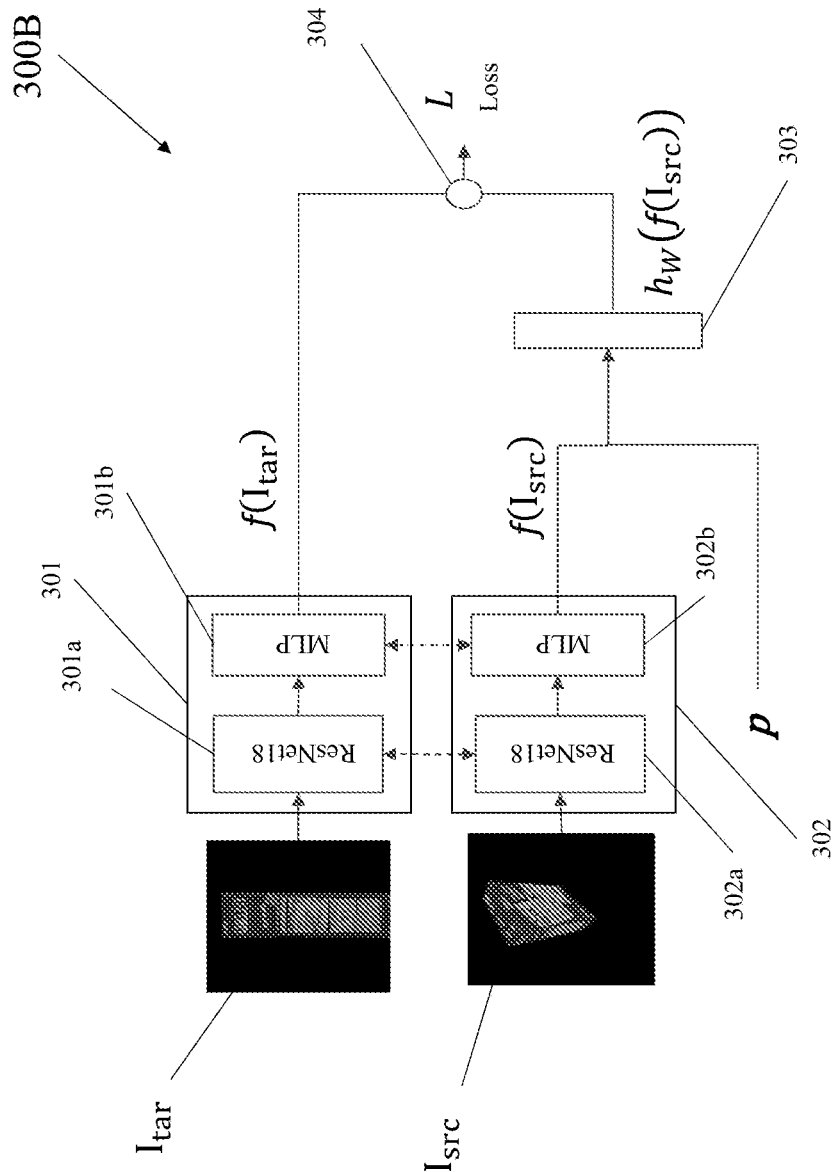
Figure 3C:
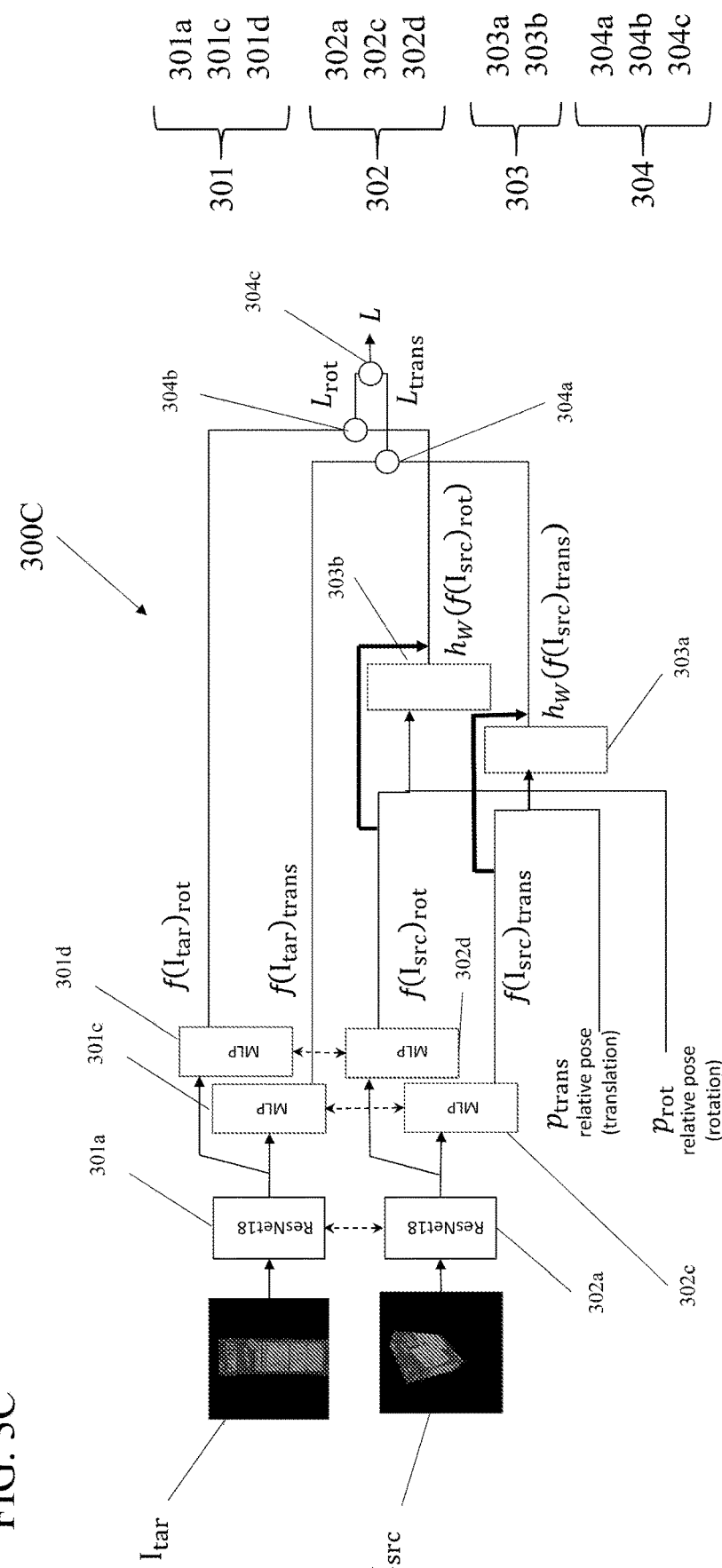

FIGS. 3A-3C are block diagrams illustrating examples of relative pose neural networks, according to embodiments. In embodiments, the relative pose neural networks illustrated in FIGS. 3A-3C may correspond to the relative pose neural network 133 discussed above.

As shown in FIG. 3A, a relative pose neural network 300A may include a feature extractor 301, a feature extractor 302, a feature transformer 303, and a loss calculator 304. In embodiments, each of the feature extractors 301 and 302 may correspond to the feature extractor 1331 discussed above, the feature transformer 303 may correspond to the feature transformer 1332 discussed above, and the loss calculator 304 may correspond to the loss calculator 1333 discussed above. In embodiments, the feature extractors 301 and 302 may share the same neural network parameters or weights, as indicated by the dashed line in FIG. 3A. In embodiments, a target image $I_{tar}$ of an object may be related to a source image $I_{src}$ of the object by an image transformation which may correspond to a relative pose p. In embodiments, the relative pose p may represent a relative position of a vision sensor which captured the source image $I_{src}$ with respect to a vision sensor which captured the target image $I_{tar}$. The feature extractor 301 may receive the target image $I_{tar}$ as input, and may output features $f(I_{tar})$ extracted from the target image $I_{tar}$, and the feature extractor 302 may receive the source image $I_{src}$ as input, and may output features $f(I_{src})$ extracted from the source image $I_{src}$. The feature transformer 303 may receive the features $f(I_{src})$ and the relative pose p, which may be for example concatenated with each other, as input, and may output transformed features $h_W(f(I_{src}))$. The loss calculator 304 may calculate a loss L between the features $f(I_{tar})$ and the transformed features $h_W(f(I_{src}))$, which may be expressed as Equation 2 below:

$$L = \| f(I_{tar}) - h_W f((I_{src})) \|^2 \qquad \text{(Equation 2)}$$

In embodiments, the relative pose neural network 300A may be trained to minimize the loss L. For example, neural network parameters (e.g. weights and biases) of the feature extractor 301, the feature extractor 302, and the feature transformer 303 may be adjusted until the loss L drops below a predetermined threshold loss. In embodiments, the relative pose neural network 300A may be trained iteratively using optimization techniques such as gradient descent. At each cycle of training, the loss L may be propagated back to the relative pose neural network 300A using a technique called backpropagation. The relative pose neural network 300A may be trained in a manner in which each neuron's coefficients/weights are adjusted relative to how much the neurons contributed to the loss in the previous training cycle. The process may be repeated iteratively until the loss L becomes less than the predetermined threshold loss. Accordingly, the feature extractors 301 and 302, which may share neural network parameters, may be trained simultaneously with the feature transformer 303. In embodiments, the relative pose neural network 300A may be trained using an image dataset associated with robot movement control and object manipulation, for example the Yale-CMU-Berkeley (YCB) Object and Model set.

In embodiments, loss L is calculated using Equation 2 may be referred to as the equivariance loss $L_{equi}$. However, if the relative pose neural network 300A is trained based on the equivariance loss $L_{equi}$ alone, it may be possible for the relative pose neural network 300A to be trained to converge the features to zero space. For example, if the loss L is calculated using Equation 2, it is possible for the training described above to result in the feature extractors 301 and 302 being trained to always output features $f(I_{tar})$ and $f(I_{src})$ which are equal to zero.

Therefore, in embodiments, instead of calculating the loss L using Equation 2 above, the loss calculator 304 may also calculate a contrastive loss $L_{geo}$ using Equation 3 below, in which $w_1$ and $w_2$ may represent non-zero constants:

$$L_{geo} = w_1 \|(\|f(I_{src}) - f(I_{tar})\| - w_2\|p\|)\| \qquad \text{(Equation 3)}$$

In embodiments, the contrastive loss $L_{geo}$ may be used to prevent the features from converging to zero space, by enforcing geodesic preservation. For example, the contrastive loss $L_{geo}$ may be used to ensure that the features $f(I_{tar})$ and $f(I_{src})$ are different from each other before the features $f(I_{src})$ are transformed by the feature transformer 303.

Accordingly, in embodiments, the loss calculator 304 may calculate the overall loss L using both the equivariant loss and the contrastive loss, as expressed in Equation 4 below:

$$L = L_{equi} + L_{geo} = \|f(I_{tar}) - h_W(f(I_{src}))\|^2 + w_1\|(\|f(I_{src}) - f(I_{tar})\| - w_2\|p\|)\| \qquad \text{(Equation 4)}$$

As shown in FIG. 3B, a relative pose neural network 300B may be similar to the relative pose neural network 300A. However, in the relative pose neural network 300B, the feature extractor 301 may include a feature extractor 301a, which may be a CNN such as a ResNet18 network, and a feature extractor 301b, which may be a multilayer perceptron (MLP). Further, the feature extractor 302 may include a feature extractor 302a, which may be a CNN such as a ResNet18 network, and a feature extractor 302b, which may be an MLP. In embodiments, the feature extractor 301a and the feature extractor 302a may share the same neural network parameters or weights, and the feature extractor 301a and the feature extractor 302a may share the same neural network parameters or weights, as indicated by the dashed lines in FIG. 3B. In embodiments, the features $f(I_{tar})$ and the features $f(I_{src})$ may be represented as 128-dimensional vectors, and the relative pose p may also be represented as a 128-dimensional vector. Accordingly, the feature transformer 303 may receive as input a 256-dimensional vector resulting from a concatenation of the features $f(I_{src})$ and the relative pose p, and may output the transformed features $h_W(f(I_{src}))$ as a 128-dimensional vector. In embodiments, the feature transformer 303 may be implemented as an MLP.

As shown in FIG. 3C, a relative pose neural network 300C may be similar to the relative pose neural network 300A and the relative pose neural network 300B discussed above. However, in the relative pose neural network 300C, the translational features and the rotational features may be considered separately. Accordingly, the relative pose p may be input as a translational relative pose $p_{trans}$ and a rotational relative pose $p_{rot}$. In addition, the features $f(I_{tar})$ may be obtained by the feature extractors 301a, 301c, and 301d as translational features $f(I_{tar})_{trans}$ and rotational features $f(I_{tar})_{rot}$, and the features $f(I_{src})$ may be obtained by the feature extractors 302a, 302c, and 302d as translational features $f(I_{src})$ trans and rotational features $f(I_{src})_{rot}$. Also, the transformed features $h_W(f(I_{src}))$ may be determined by the feature transformer 303a and the feature transformer 303b as transformed translational features $h_W(f(I_{src})_{trans})$ and transformed rotational features $h_W(f(I_{src})_{rot})$. Further, the loss L may be calculated by the loss calculators 304a, 304b, and 304c based on a translational loss $L_{trans}$ and a rotational loss $L_{rot}$.

In embodiments, after the relative pose neural network 133 is trained, for example as discussed above with respect to FIGS. 3A-3C, it can be used to compute a relative pose between a source image and a target image, and may further be used to determine a relative trajectory of movement of a vision sensor which may converge the source image to the target image based on a network gradient.

Figure 4A:
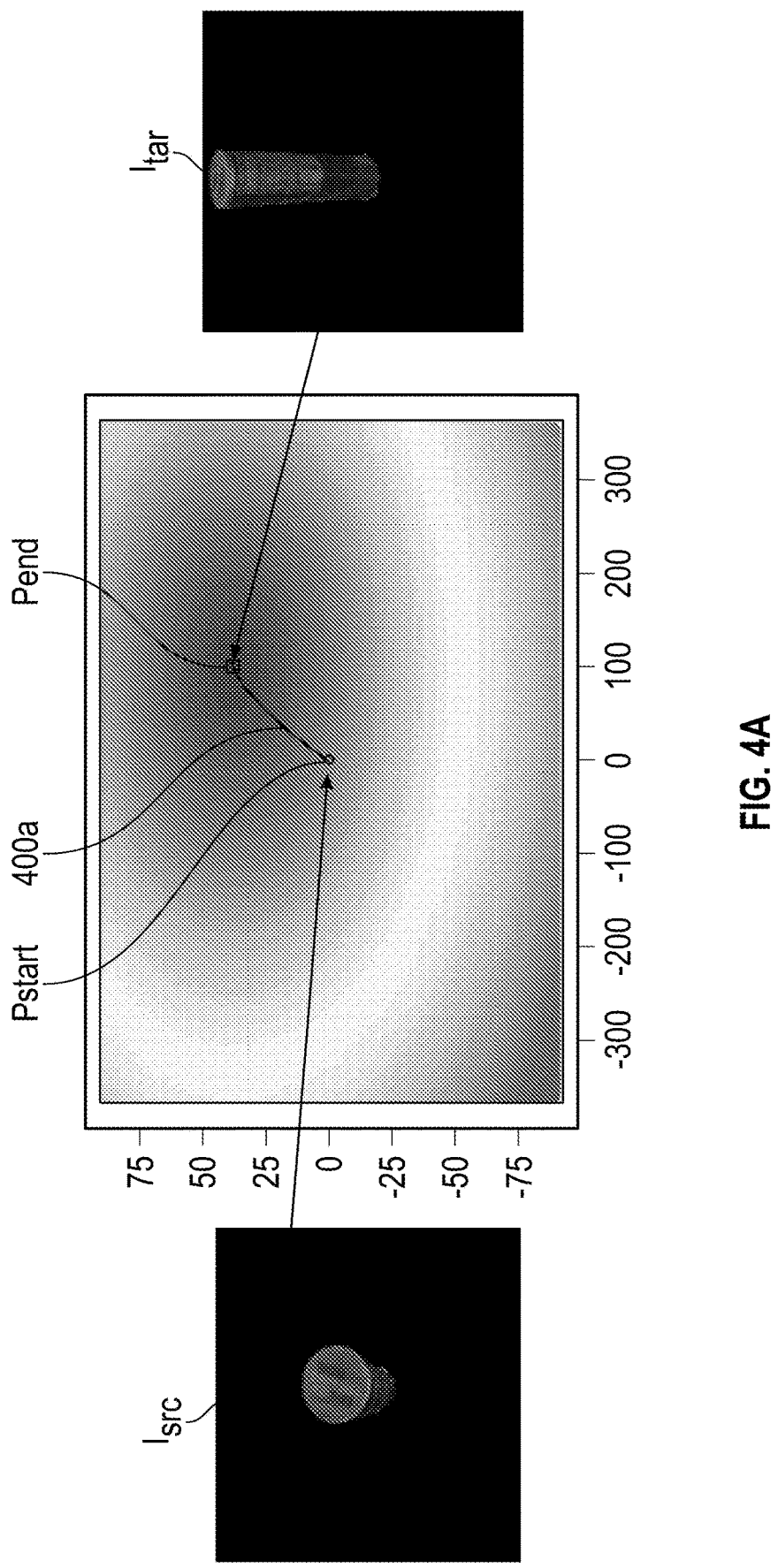
FIGS. 4A-4C illustrate an example of a process of determining a relative trajectory, according to embodiments.
Figure 4B:
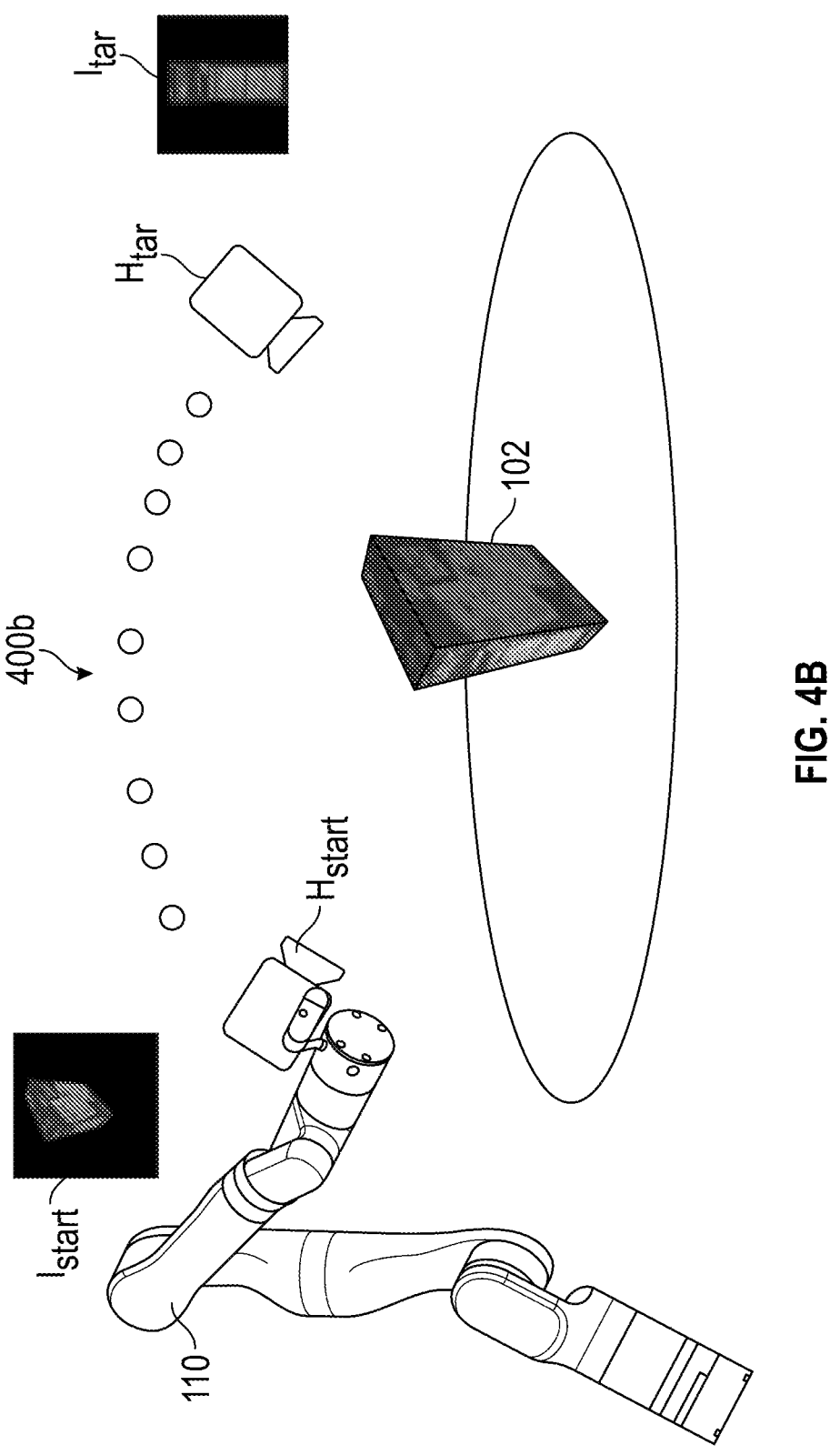
Figure 4C:
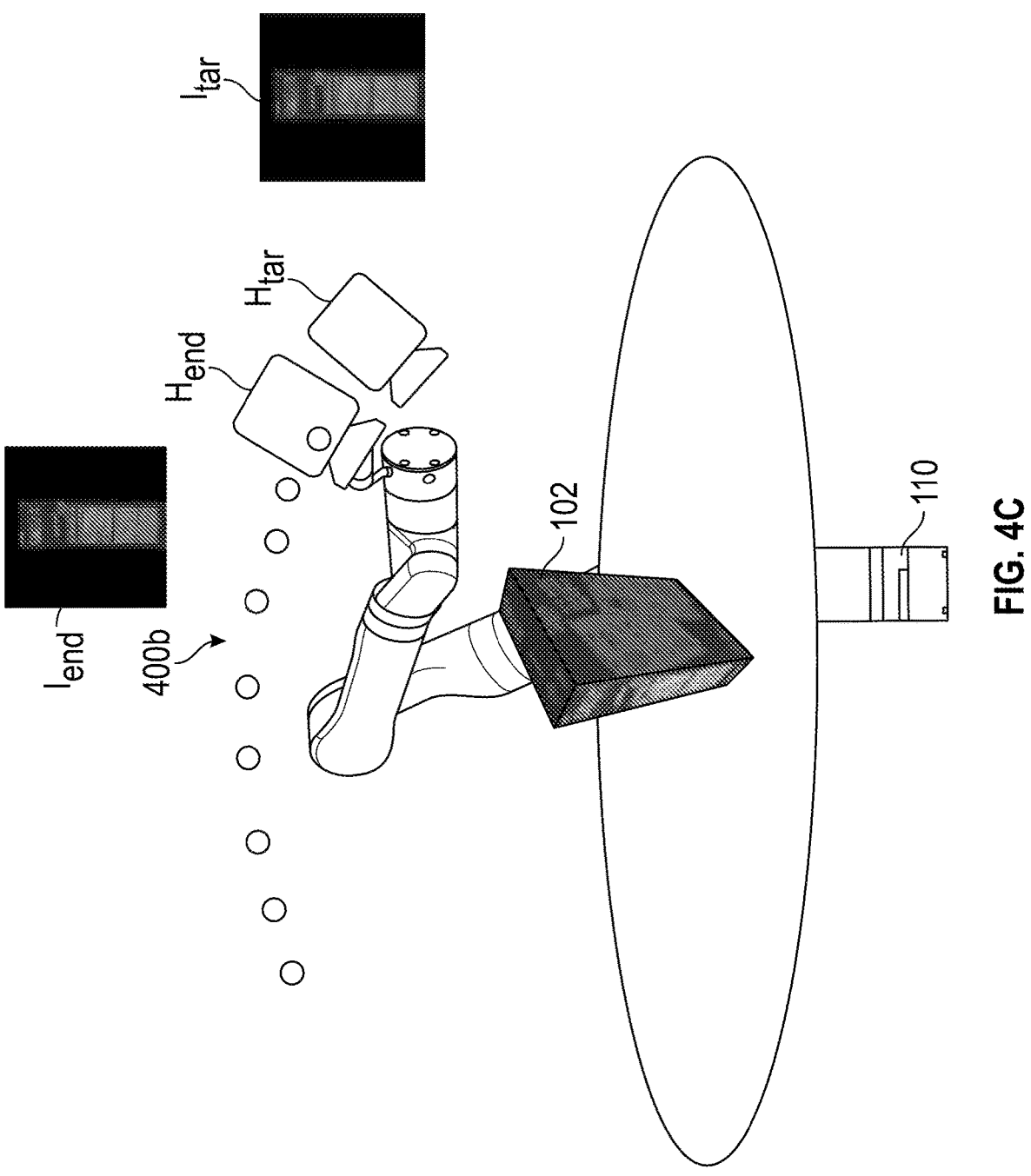

FIGS. 4A-4C illustrate an example of a process of determining a relative trajectory.

For example, in embodiments, given a particular target image $I_{tar}$ and a particular source image $I_{src}$, a plurality of candidate relative poses p may be provided to relative pose neural network 133, and a corresponding plurality of losses L may be determined. As the plurality of losses L are determined, the plurality of candidate relative poses p may be stored sequentially in a relative pose list, which may be arranged in an order of descending loss until a minimum loss L is found.

When the plurality of candidate relative poses p are arranged in an order of descending loss, they may form a relative trajectory 402a. In embodiments, the relative trajectory 402a may start at a relative pose $p_{start}$ which transforms the source image $I_{src}$ into an image $I_{start}$ that is least similar to the target image $I_{tar}$, and may end at a relative pose $p_{end}$ which transforms the source image $I_{src}$ into an image Iend that is most similar to the target image $I_{tar}$. Accordingly, the relative trajectory 402a may correspond to an absolute trajectory 402b which the vision sensor 120 may follow from an absolute position $H_{start}$, which corresponds to the relative pose $p_{start}$, to an absolute position $H_{end}$, which corresponds to the relative pose $p_{end}$. In embodiments, the absolute position $H_{end}$ may be an absolute position from the absolute trajectory 402b which is closest to an absolute position $H_{tar}$ at which the vision sensor 120 would capture an image identical to $I_{tar}$. Accordingly, because the absolute trajectory 402b may be smooth, changes such as a modification of the target image target image $I_{tar}$ can be easily adapted to.

In embodiments, the relative pose $p_{end}$ may be referred to as the optimal relative pose p*, which may be understood as an image transformation which best explains the feature transformation. As an example, the optimal relative pose may be found using a gradient descent method, by finding a solution to Equation 5 below:

$$p^* = \arg\min_{p} \|f(I_{tar}) - h_W((f(I_{src}))\|^2 \qquad \text{(Equation 5)}$$

For fixed images, the loss $L = \|f(I_{tar}) - h_W(f(I_{src}))\|^2$ may be a function of p. According to an example of a gradient descent method, starting with a current relative pose $p_t$, which may be set to zero, a corresponding loss Lt may be calculated by the loss calculator 1333. Then an updated relative pose $p_{t+1}$ may be determined according to Equation 6 below:

$$p_{t+1} = p_t - \delta\frac{\partial L}{\partial p} \qquad \text{(Equation 6)}$$

In Equation 6 above, $\delta$ represents a step size of the gradient descent. In embodiments, $$\frac{\partial L}{\partial p}$$

may be calculated using a machine learning framework, for example PyTorch. For example, the relative pose p may be represented as a vector, as shown in Equation 7 below:

$$p = [x, y, z, \theta_r, \theta_p, \theta_y] \qquad \text{(Equation 7)}$$

In Equation 7 above, [x, y, z] represent relative translational components of the relative pose p, and $[\theta_r, \theta_p, \theta_y]$ represent relative rotational components of the relative pose p. A machine learning framework such as PyTorch may be used to determine a numerical partial derivative of the loss L with respect to input parameters according to Equation 8 below:

$$\frac{\partial L}{\partial p} = \left[\frac{\partial L}{\partial x}, \frac{\partial L}{\partial y}, \frac{\partial L}{\partial z}, \frac{\partial L}{\partial \theta_x}, \frac{\partial L}{\partial \theta_y}, \frac{\partial L}{\partial \theta_z}\right] \qquad \text{(Equation 8)}$$

According to the gradient descent method, the relative pose p may be updated until the loss L no longer increases.

In embodiments, the step size $\delta$ may be selected to provide a smooth trajectory. For example, a step size which is too large may cause the tool 110 to be unstable as it follows the trajectory, and a step size which is too small may cause the convergence to be unnecessarily slow. In embodiments, the smoothness of the trajectory may be determined based on the second derivative of the relative pose p, which may be expressed as $\|(p_{t+2}-p_{t+1})-(p_{t+1}-p_t)\|$. In embodiments, the step size $\delta$ may be held constant.

In embodiments, the gradient descent may be determined in consideration of momentum v. For example, a current momentum $v_t$ may be determined according to Equation 9 below:

$$v_t = 0.9v_{t-1} + 0.1\frac{\partial L}{\partial p} \qquad \text{(Equation 9)}$$

Based on Equation 9, the updated relative pose $p_{t+1}$ may be determined according to Equation 10 below:

$$p_{t+1} = p_t - \delta + v_t \qquad \text{(Equation 10)}$$

Figure 5A:
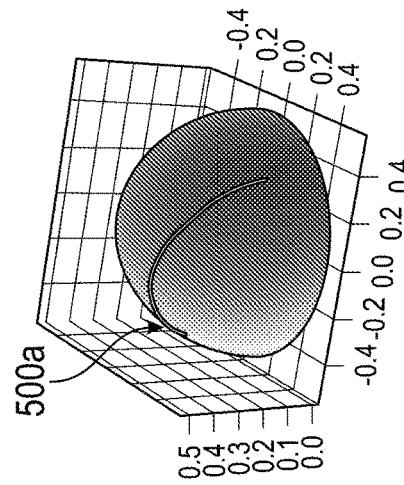
FIGS. 5A-5F illustrate further examples of relative trajectories, according to embodiments.
Figure 5A:
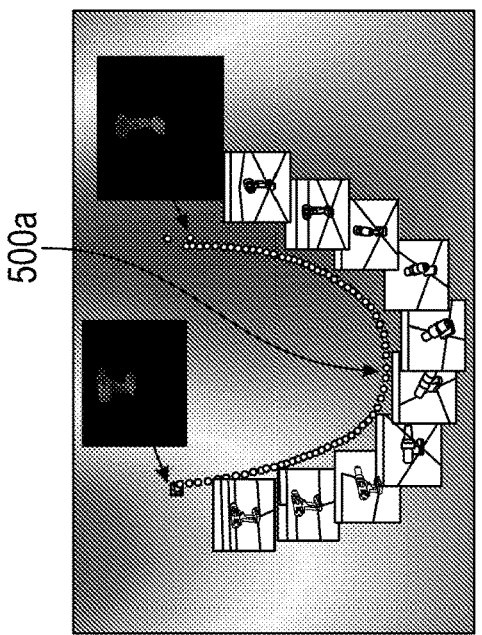
Figure 5A:
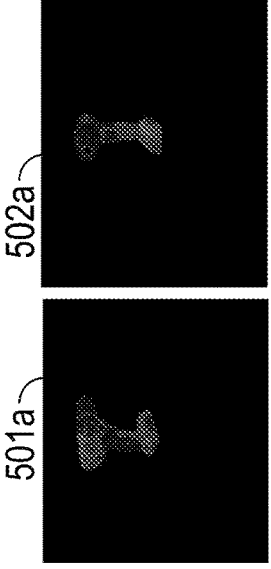
Figure 5B:
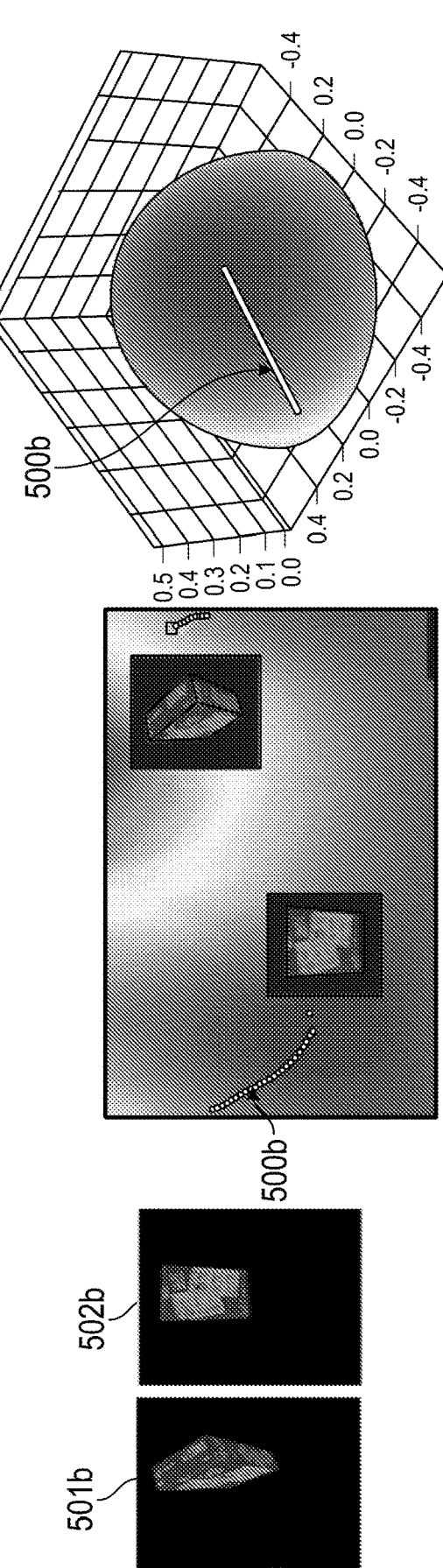
Figure 5C:
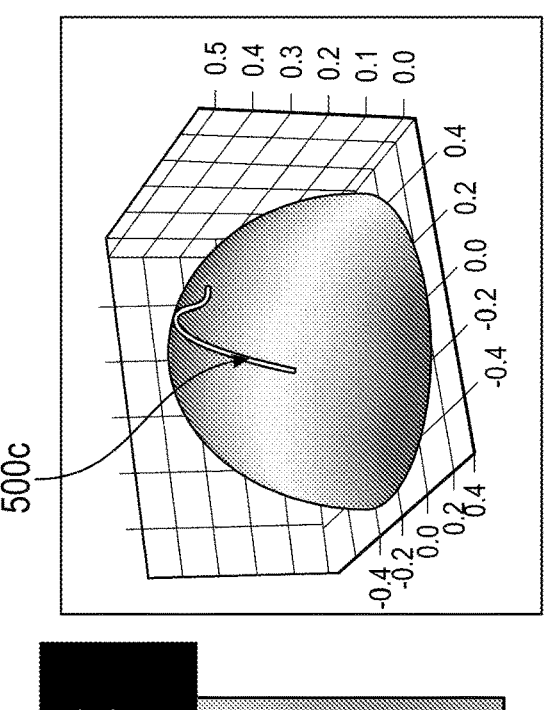
Figure 5C:
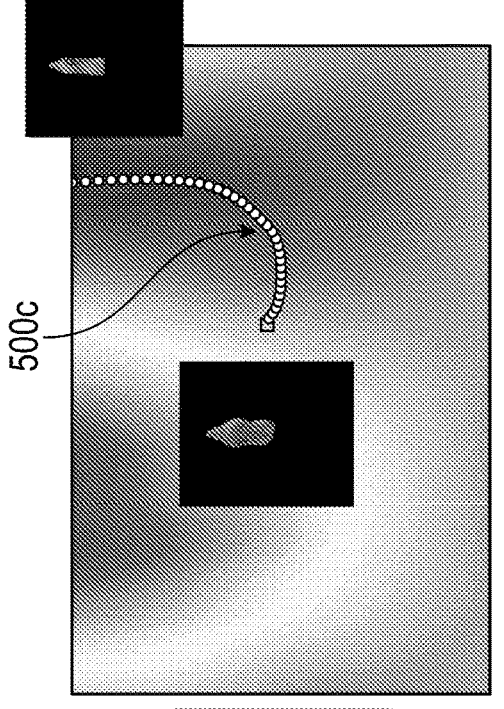
Figure 5C:
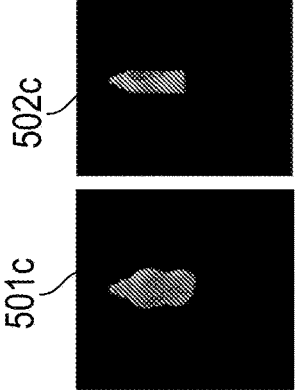
Figure 5D:
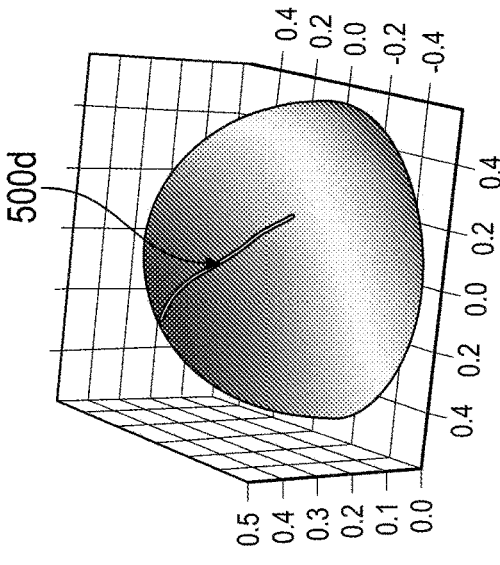
Figure 5D:
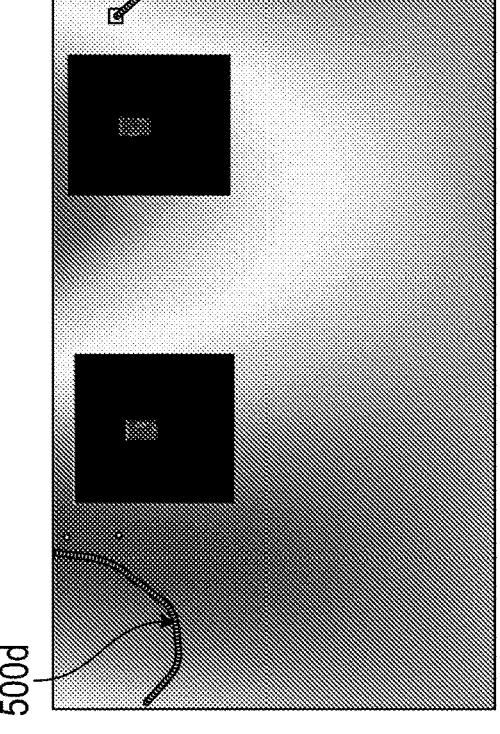
Figure 5D:
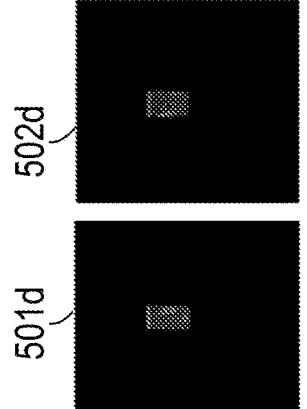
Figure 5E:
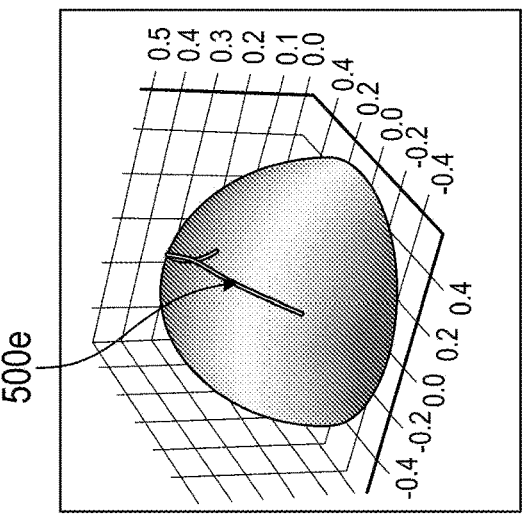
Figure 5E:
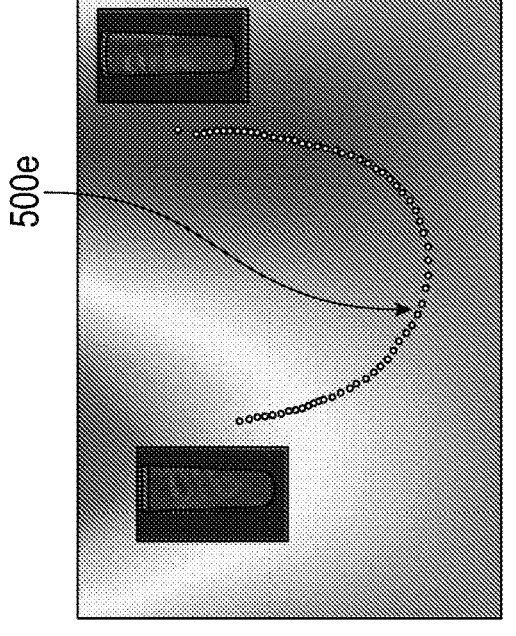
Figure 5E:
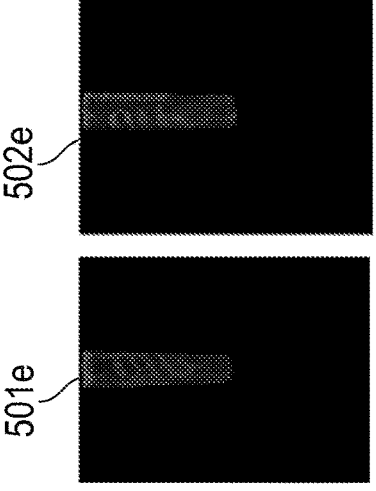
Figure 5F:
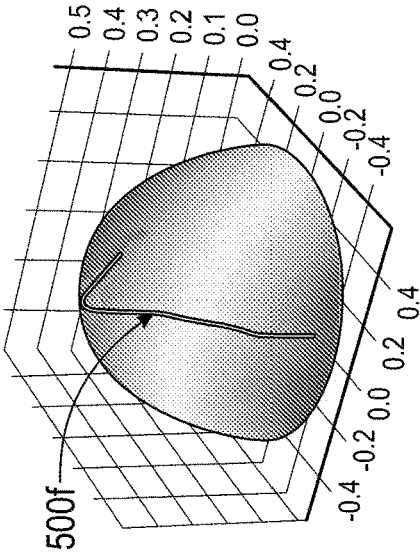
Figure 5F:
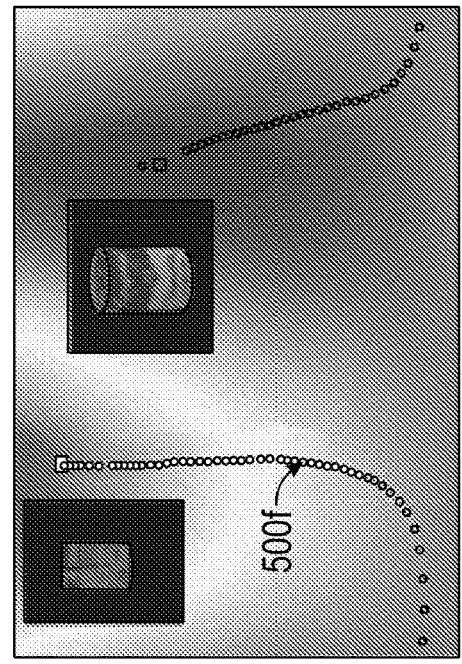
Figure 5F:
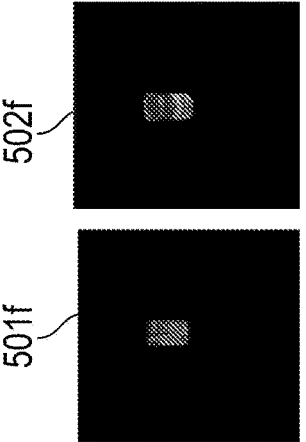

FIGS. 5A-5F illustrate further examples of relative trajectories. In particular, FIG. 5A illustrates a relative trajectory 500a corresponding to a source image 501a and a target image 502a. FIG. 5B illustrates a relative trajectory 500b corresponding to a source image 501b and a target image 502b. FIG. 5C illustrates a relative trajectory 500c corresponding to a source image 501c and a target image 502c. FIG. 5D illustrates a relative trajectory 500d corresponding to a source image 501d and a target image 502d. FIG. 5E illustrates a relative trajectory 500e corresponding to a source image 501e and a target image 502e. FIG. 5F illustrates a relative trajectory 500f corresponding to a source image 501f and a target image 502f.

In embodiments, the motion controller 1342 may select a desired relative pose $p_d$, and may generate a movement command which may cause the tool 110 to move according to the desired relative poses $p_d$. In order to move the tool 110 from a current absolute pose $H_1$ to a desired absolute pose $H_d$ corresponding to the desired relative pose $p_d$, the motion controller 1342 may calculate a plurality of joint angles of the joints 111 which would cause the vision sensor 120 to be positioned according to the absolute pose $H_d$.

As an example, the motion controller 1342 may determine to move the tool 110 according to the absolute trajectory 402b. Accordingly, the motion controller 1342 may obtain the relative pose list corresponding to the relative trajectory 402a. For relative poses $p_1$ through $p_N$ included in the relative pose list, the motion controller 1342 may calculate corresponding homogeneous transforms $H_{p_1}$ through $H_{p_N}$, such that a given absolute pose $H_k$ may be calculated according to Equation 11 below:

$$H_k = H_1 H_{p_k} \qquad \text{(Equation 11)}$$

In embodiments, the motion controller 1342 may determine the current absolute pose $H_1$. Accordingly, the motion controller 1342 may calculate the remaining absolute poses $H_2$ through $H_N$ included in the absolute trajectory 402b based on Equation 11, may calculate joint angles corresponding to the absolute poses $H_1$ through $H_N$ using inverse kinematics, and may control the joints 111 to move according to the joint angles such that the tool 110 moves the vision sensor 120 along the absolute trajectory 402b.

Figure 6:
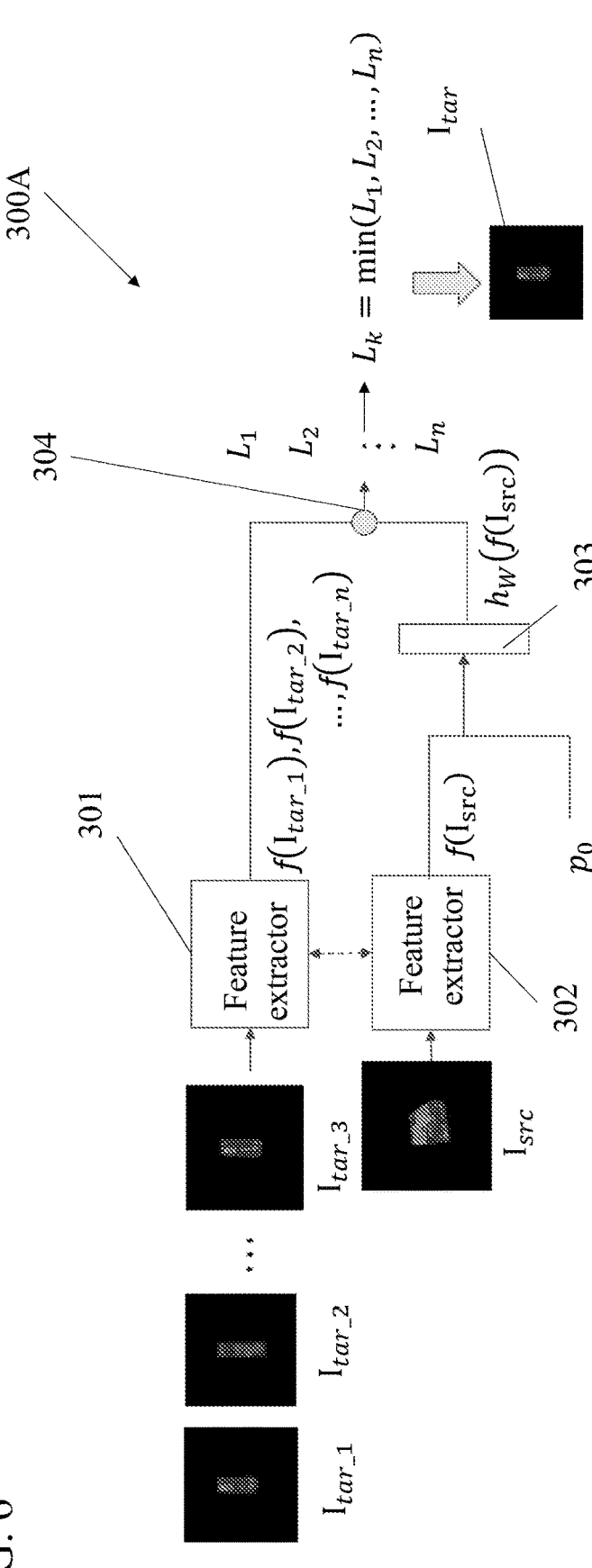
FIG. 6 is a block diagram illustrating a process for using a relative pose neural network to select a target image, according to embodiments.

FIG. 6 is a block diagram illustrating a process for using a relative pose neural network to select a target image, according to embodiments. After the relative pose neural network 300A is trained as discussed above, it may be used to select a target image $I_{tar}$ which is suitable to be used with a current source image $I_{src}$. Although FIG. 6 illustrates the relative pose neural network 300A as being used to select the target image $I_{tar}$, embodiments are not limited thereto, and in embodiments any of the relative pose neural networks discussed above may be used to select the target image $I_{tar}$.

As can be seen in FIG. 6, a plurality of candidate target images $I_{tar\_1}$, $I_{tar\_2}$, . . . , and $I_{tar\_n}$ may be provided to the trained relative pose neural network 300A. The feature extractor 301 may extract a plurality of features $f(I_{tar\_1})$, $f(I_{tar\_2})$, . . . , and $f(I_{tar\_n})$ based on the plurality of candidate target images $I_{tar\_1}$, $I_{tar\_2}$, . . . , and $I_{tar\_n}$. The feature extractor 302 may extract features $f(I_{src})$ based on the source image $I_{src}$, and the feature transformed 303 may determine transformed features $h_{vs}f(I_{src})$ based on the features $f(I_{src})$ and an initial relative pose $p_0$. The loss calculator 304 may calculate a plurality of losses $L_1, L_2, \ldots,$ and $L_n$ based on the plurality of candidate target images $I_{tar\_1}, I_{tar\_2}, \ldots,$ and $I_{tar\_n}$ and the transformed features $h_{vs}f(I_{src})$, and a minimum loss Lx may be determined from among the plurality of losses $L_1, L_2, \ldots,$ and $L_n$. In embodiments, the candidate target image corresponding to the minimum loss Lk may be selected as the target image $I_{tar}$. Because the target image $I_{tar}$ may correspond to a relatively low loss L with respect to the source image $I_{src}$, the target image $I_{tar}$ may be relatively similar to the source image $I_{src}$. Therefore, a number of calculations required to perform a process of visual servoing may be reduced, and the apparatus 100 may operate more efficiently.

Figure 7A:
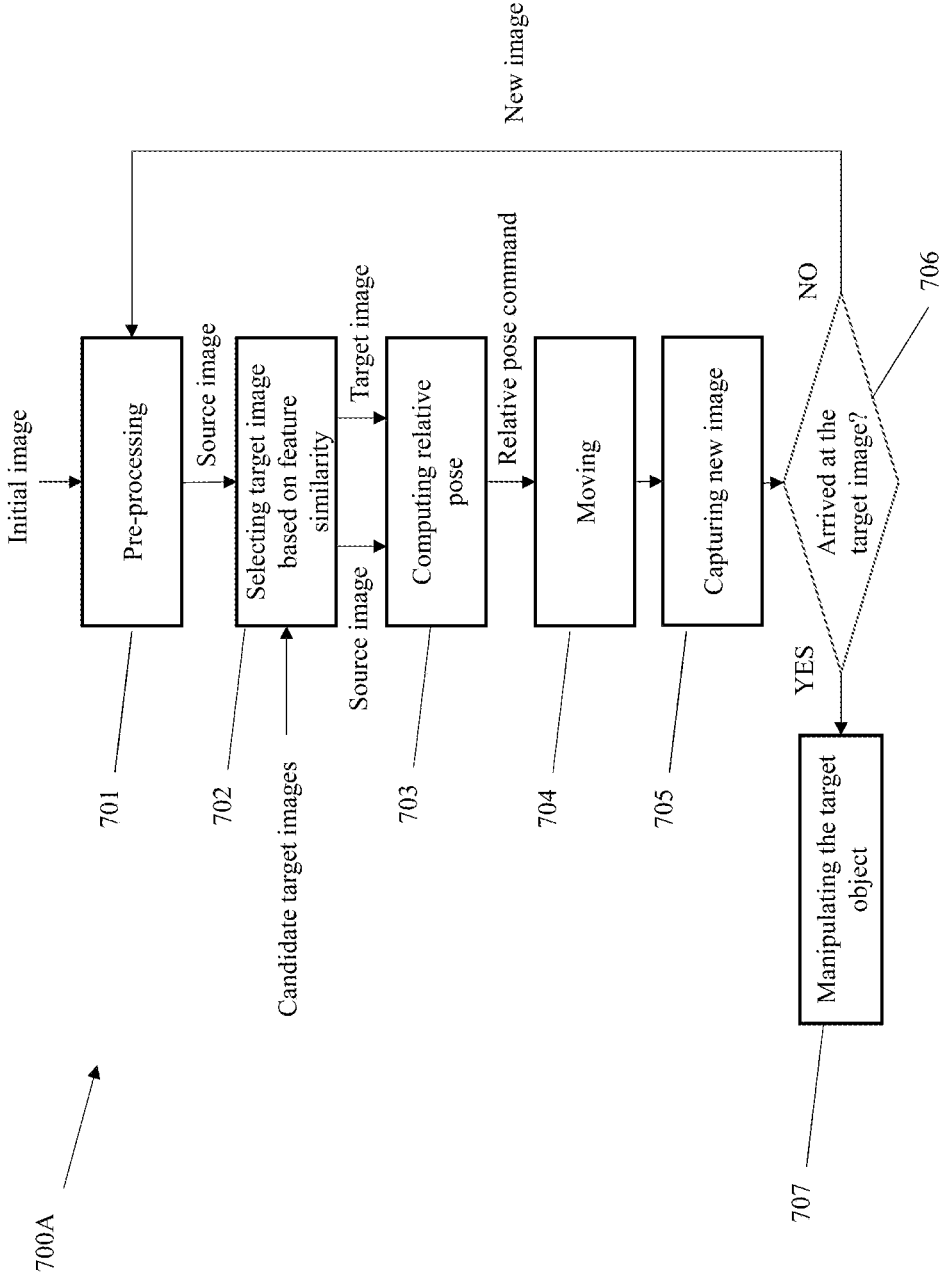
FIG. 7A is a flowchart illustrating an example process 700A for performing visual servoing to manipulate a target object, according to embodiments.

FIG. 7A is a flowchart illustrating an example process 700A for performing visual servoing to manipulate a target object, according to embodiments. In embodiments, the process 700A may be performed by at least one processor using the apparatus 100 of FIG. 1A.

As shown in FIG. 7A, in operation 701, the process 700A includes obtaining an initial image of a target object, and pre-processing the initial image to obtain a source image. In embodiments, the target object may correspond to the target object 102, the initial image may be captured by the vision sensor 120, and the source image may correspond to the source image $I_{src}$ discussed above.

In operation 702, the process 700A includes receiving a plurality of candidate target images, and selecting a target image based on feature similarity. In embodiments, the target image may correspond to the target image $I_{tar}$, and the selecting may be performed according to FIG. 6 as discussed above.

In operation 703, the process 700A includes determining a relative pose of a tool with respect to the target object based on the source image and the target image. In embodiments, the tool may correspond to the tool 110 discussed above, and the relative pose may correspond to the relative pose p discussed above.

In operation 704, the process 700A includes moving the tool based on the determined relative pose.

In operation 705, the process 700A includes capturing a new image of the target object. In embodiments, the new image may be captured by the vision sensor 120.

In operation 706 the process 700A includes comparing the new image with the target image to determine whether the tool has arrived at an absolute position corresponding to the target image as a result of the movement. In embodiments, the comparing may include calculating a similarity value corresponding to the new image and the target image, and determining whether the tool has arrived at the target image by comparing the calculated similarity value with a threshold similarity value. In embodiments, operation 706 may be performed by the similarity calculator 1341.

Based on determining that the tool has arrived at the target image (YES at operation 706), the process 700A may proceed to operation 707, in which the target object may be manipulated by a manipulator corresponding to the tool. In embodiments, the manipulator may correspond to the manipulator 112. For example, when a gripper of a robot arm is used as the manipulator 112, the manipulation of the target object may include grasping the target object.

Based on determining that the tool has not arrived at the target image (NO at operation 706), the process 700A may proceed to operation 701, and the process 700A may be performed again based on the new image of the target object.

Figure 7B:
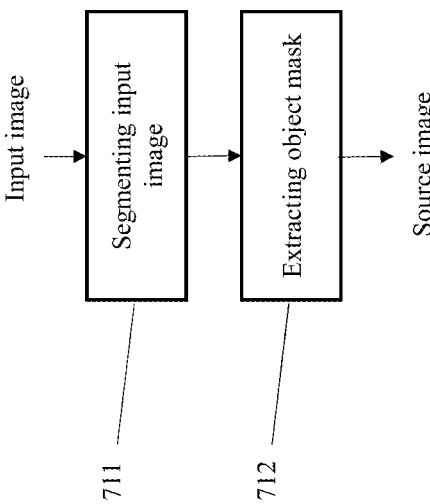
FIG. 7B is a flowchart illustrating an example process 700B for obtaining a source image, according to embodiments.

FIG. 7B is a flowchart illustrating an example process 700B for obtaining a source image, according to embodiments. In embodiments, the process 700B may be an example of operation 701, and may be performed by the image pre-processor 132 of FIG. 1B. As shown in FIG. 7B, in operation 711, the process 700B includes segmenting the input image. In operation 712, the process 700B includes extracting an object mask, and obtaining the source image based on the object mask.

Figure 7C:
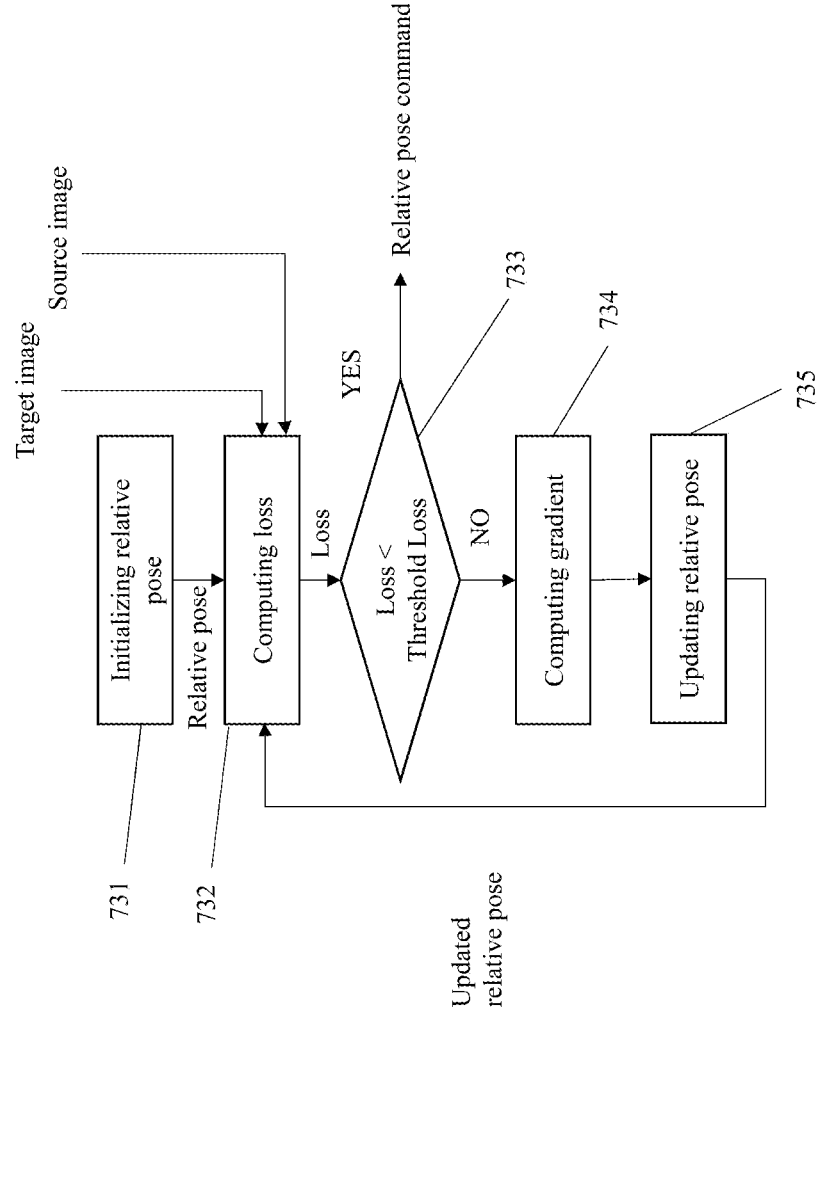
FIG. 7C is a flowchart illustrating an example process 700C for obtaining a relative pose, according to embodiments.

FIG. 7C is a flowchart illustrating an example process 700C for obtaining a relative pose, according to embodiments. In embodiments, the process 700C may be an example of operation 703, and may be performed by the relative pose neural network 133 of FIG. 1B.

As shown in FIG. 7C, in operation 731, the process 700C includes initializing a relative pose.

As shown in FIG. 7C, in operation 732, the process 700C includes computing a loss corresponding to the initial relative pose, the target image, and the source image. In embodiments, the computed loss may correspond to the loss L discussed above.

As shown in FIG. 7C, in operation 733, the process 700C includes determining whether the computed loss is less than a threshold loss.

Based on determining that the loss is less than the threshold loss (YES at operation 733), the process 700C includes generating a relative pose command. For example, the relative pose command may include information indicating the determined relative pose.

Based on determining that the loss is greater than or equal to the threshold loss (NO at operation 733), the process 700C may proceed to operation 734, at which a gradient is calculated, and operation 735, at which the relative pose is updated. In embodiments, operations 734 and 735 may correspond to the gradient descent method discussed above.

In embodiments, the operation 700C may then return to operation 732, in which the loss may be calculated based on the updated relative pose, the target image, and the source image.

Figure 7D:
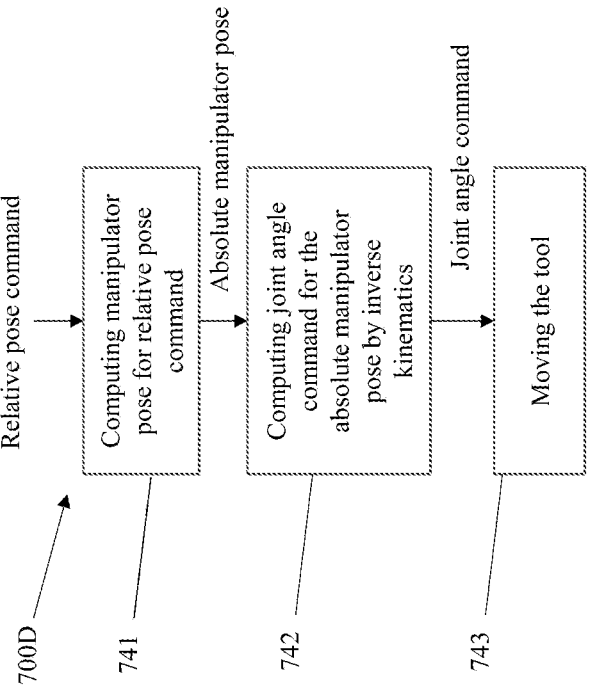
FIG. 7D is a flowchart illustrating an example process 700D for moving a tool, according to embodiments.

FIG. 7D is a flowchart illustrating an example process 700D for moving a tool, according to embodiments. In embodiments, the process 700D may be an example of operation 704, and may be performed by the motion controller 1342 of FIG. 1B.

As shown in FIG. 7D, in operation 741, the process 700D includes receiving the relative pose command, and computing an absolute manipulator pose corresponding to the relative pose command. In embodiments, the absolute manipulator pose may correspond to one or more of the absolute poses H included in the absolute trajectory 400*b* discussed above.

In operation 742, the process 700D includes computing joint angles corresponding to the absolute manipulator pose using inverse kinematics. In embodiments, the joint angle command may include a command for setting the joint angles of the joints 111, as discussed above.

In operation 743, the process 700D includes moving the tool according to the joint angle commands.

Figure 7E:
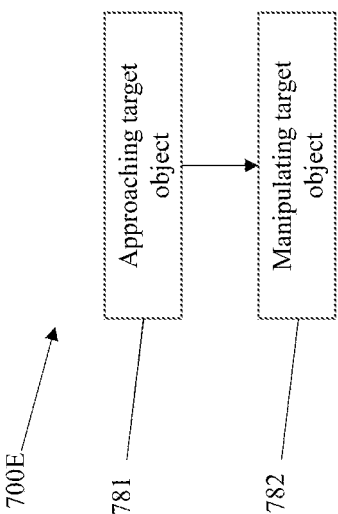
FIG. 7E is a flowchart illustrating an example process 700E for manipulating a target object, according to embodiments.

FIG. 7E is a flowchart illustrating an example process 700E for manipulating a target object, according to embodiments. In embodiments, the process 700E may be an example of operation 707, and may be performed by the manipulation controller 1343 of FIG. 1B. As shown in FIG. 7E, the process 700E may include controlling the tool to move the manipulator to approach the target object at operation 781, and controlling the manipulator to manipulate the target object at operation 782.

In embodiments, the movement and the manipulation may proceed according to a predetermined movement and a predetermined manipulation which correspond to the target image. For example, the predetermined movement and the predetermined manipulation may be determined in advance to be suitable to allow any appropriate tool, which is in a position corresponding to the target image, to manipulate the target object.

As discussed above, when a gripper of a robot arm is used as the manipulator 112, the manipulation of the target object may include grasping the target object. Accordingly, the predetermined movement and the predetermined manipulation may include a movement and a grasping that may be determined in advance to allow the gripper to grasp the target object, based on the gripper being in a position corresponding to the target image.

Figure 8:
FIG. 8 is a flowchart illustrating an example process 800 for performing visual servoing to manipulate a target object, according to embodiments.

FIG. 8 is a flowchart illustrating an example process 800 for performing visual servoing to manipulate a target object, according to embodiments. In embodiments, the process 800 may be performed by at least one processor using the apparatus 100 discussed above.

As shown in FIG. 8, in operation 801, the process 800 includes obtaining an image. In embodiments, the image may correspond to the source image $I_{src}$ of the target object 102 discussed above.

In operation 802, the process 800 includes obtaining relative pose information. In embodiments, the relative pose information may correspond to the relative pose p discussed above, which may indicate a relative pose of the tool 110 with respect to a target image $I_{tar}$ and may be determined using the relative pose neural network 133.

In operation 802, the process 800 includes generating a similarity value between the source image and the target image.

In operation 804, the process 800 includes determining whether the similarity value is greater than a threshold similarity value.

Based on determining that the similarity value is greater than the threshold similarity value (YES at operation 804), the process 800 proceeds to operation 805, which includes generating a manipulation command corresponding to the target object.

Based on determining that the similarity value is not greater than the threshold similarity value (NO at operation 804), the process 800 proceeds to operation 806, which includes generating a movement command based on the metric ADD may represent a 3D Euclidean distance of pairwise points between a 3D model point cloud transformed by the ground truth and an estimated pose. In embodiments, the ADD metric may be calculated according to Equation 12 below:

$$ADD = \frac{1}{|M|} \sum_{x \in M} \left\| (Rx + T) - (\hat{R}x + \hat{T}) \right\| \qquad \text{(Equation 12)}$$

In Equation 12 above, M represents a set of point clouds in a model, and $|M|$ represents a cardinality of the set. Further, R and T represent a ground truth absolute pose of the image with respect to the object coordinate frame, and $\hat{R}$ and $\hat{T}$ represent the estimated pose. In embodiments, a lower ADD may be considered better.

In addition, a probability of correct servoing (PCS) metric may measure a successful servoing rate. In embodiments, the PCS metric may be calculated according to Equation 13 below:

$$PCS_\varepsilon = \frac{\sum_i \delta(ADD_i < \varepsilon)}{N} \qquad \text{(Equation 13)}$$

In Equation 13 above, $\delta$ represents the Dirac delta function, $ADD_i$ represents the ADD of the $i^{th}$ testing data instance, $\varepsilon$ represents the error tolerance to be considered successful servoing, and N represents a number of testing data instances. In embodiments, a higher PCS may be considered better.

Table 1 below shows an example of experimental results of grasping various objects using embodiments described above (referred to in Table 1 as "Ours") in comparison with several other visual servoing techniques, for example Image-Based Visual Servoing (IBVS), which may be a visual servoing method based on feature mapping, PoseCNN+visual servoing, which may be a supervised learning method that regresses the absolute camera pose with respect to the pre-defined object coordinate system and requires 3D bounding box ground truth of an object to train, and Relative Pose Regression+visual servoing, which may be a baseline that directly regresses the relative transformation without 3D ground truth. In Table 1, the ADD error tolerance $\varepsilon$ may be 0.3 centimeters.

TABLE 1

| Object | IBVS [28] | | PoseCNN + VS [8] | | RPR + VS | | Ours + VS | |
|---|---|---|---|---|---|---|---|---|
| | $PCS_{0.03}$ ↑ | ADD↓ | $PCS_{0.03}$ ↑ | ADD↓ | $PCS_{0.03}$ ↑ | ADD↓ | $PCS_{0.03}$ ↑ | ADD↓ |
| Cracker box | 0.00 | 0.1246 | 0.64 | 0.0351 | 0.46 | 0.0392 | 0.91 | 0.0181 |
| Chip can | 0.01 | 0.1635 | — | — | 0.33 | 0.0457 | 0.76 | 0.0231 |
| Gelatin box | 0.07 | 0.0568 | 0.94 | 0.0236 | 0.89 | 0.0172 | 0.99 | 0.0077 |
| Master can | 0.02 | 0.0832 | 0.39 | 0.0417 | 0.76 | 0.0282 | 1.00 | 0.0103 |
| Mustard bottle | 0.02 | 0.0749 | 0.13 | 0.0457 | 0.79 | 0.0227 | 1.00 | 0.0074 |
| Power drill | 0.00 | 0.1389 | 0.35 | 0.0396 | 0.44 | 0.0423 | 0.91 | 0.0160 |
| Tomato can | 0.02 | 0.0572 | 0.76 | 0.0313 | 0.92 | 0.0159 | 1.00 | 0.0070 | relative pose information, and operation 807, which includes moving the manipulator based on the generated movement command.

The process 800 may then return to operation 801, and obtain a new image of the target object.

In embodiments, performance may be evaluated according to various metrics. For example, an average distance As can be send above, RPR may be less accurate in PCS with higher ADD than embodiments of the present disclosure. This may be due to the lack of 3D equivariance in the learned representation, which is likely to be overfitted to the training data. In terms of ADD, embodiments of the present disclosure achieve 36% of ADD compared to PoseCNN and 43% of ADD compared to RPR.

Accordingly, embodiments may relate to a methods and apparatuses for controlling robot movement and performing object manipulation using self-supervised visual servoing. Embodiments may estimate the relative 3D transformation between a source image and a target image in which the baseline between the two images is substantially large, for example too large for local feature matching based approaches to apply. Unlike approaches which learn an absolute pose with respect to an object coordinate system, hence requiring labeled data, embodiments may provide a self-supervised representation learning framework based on relative transformations to obtain an estimated relative pose, for example a relative pose between a vision sensor and an object. To enable self-supervised learning, embodiments may leverage a geometric property called 3D equivariance to jointly learn a visual representation and its feature transformation in an end-to-end manner. To avoid a trivial solution, embodiments may incorporate a geodesic preserving constraint. According to embodiments, supervision of an object-specific coordinate system may not be required. To that end, embodiments may use a Siamese neural network architecture that can effectively enforce the 3D equivariance. Embodiments may use the estimated relative pose to perform visual servoing, for example by controlling movement of a tool such as a robot arm in order to allow the tool to manipulate or otherwise interact with a target object, for example by grasping the target object with an end-effector.

While the embodiments of the disclosure have been described with reference to the figures, it will be understood by those of ordinary skill in the art that various changes in form and details may be made therein without departing from the spirit and scope as defined by the following claims.

What is claimed is:

1. An electronic device for manipulating a target object, the electronic device comprising:
    a camera;
    at least one processor;
    a memory configured to store instructions which, when executed by the at least one processor, cause the electronic device to:
        obtain a first image of the target object, wherein the first image is captured by the camera,
        provide the first image and a target image to an artificial intelligence (AI) model to obtain relative pose information representing a relative 3-dimensional transformation about the first image with respect to the target image, wherein the relative 3-dimensional transformation includes relative translational components and relative rotational components, and wherein the target image is a pre-trained image stored in the memory for manipulating the target object at the electronic device,
        generate a similarity value representing a similarity between the first image and the target image, and
        generate a control command comprising one from among a movement command and a manipulation command based on the similarity value,
    wherein based on the similarity value being less than or equal to a threshold value, the control command comprises the movement command for moving a manipulator associated with the electronic device from a first position to a second position based on the obtained relative pose information representing the relative 3-dimensional transformation, and
    wherein based on the similarity value being greater than the threshold value, the control command comprises the manipulation command for manipulating the target object using the manipulator.

2. The electronic device of claim 1, wherein based on the similarity value being less than or equal to the threshold value, the at least one processor is further configured to:
    control the manipulator to move to the second position based on the movement command,
    obtain a second image of the target object, wherein the second image is captured by the camera,
    provide the second image and the target image to the AI model to obtain updated relative pose information about the second image with respect to the target image,
    generate an updated similarity value corresponding to the second image and the target image, and
    generate an updated control command based on the updated similarity value,
    wherein based on the updated similarity value being less than or equal to the threshold value, the updated control command comprises an updated movement command for moving the manipulator from the second position to a third position based on the updated relative pose information, and
    wherein based on the updated similarity value being greater than the threshold value, the updated control command comprises the manipulation command for manipulating the target object using the manipulator.

3. The electronic device of claim 1, wherein the manipulator comprises a robot arm having an end-effector configured to grasp the target object,
    wherein the camera is attached to the robot arm such that an orientation of the end-effector with respect to the camera is fixed,
    wherein the relative pose information indicates a relative pose of the robot arm with respect to the target object while the robot arm is located at the first position,
    wherein the manipulation command comprises a grasping command, and
    wherein the at least one processor is further configured to, based on the grasping command, control the end-effector to grasp the target object.

4. The electronic device of claim 3, wherein the target image is selected from among a plurality of target images using the AI model.

5. The electronic device of claim 1, wherein the AI model comprises:
    a first feature extraction network configured to obtain a first feature set based on the first image;
    a second feature extraction network configured to obtain a second feature set based on the target image; and
    a feature transformation network configured to transform the first feature set to obtain a plurality of transformed first feature sets based on a plurality of candidate poses.

6. The electronic device of claim 5, wherein the first feature extraction network, the second feature extraction network, and the feature transformation network are trained together, and
    wherein the first feature extraction network and the second feature extraction network share same weights.

7. The electronic device of claim 5, wherein the at least one processor is further configured to determine a plurality of losses between the second feature set and the plurality of transformed first feature sets, and
    wherein the relative pose information corresponds to a candidate pose associated with a smallest loss from among the plurality of losses.

8. The electronic device of claim 7, wherein to generate the movement command, the at least one processor is further configured to:

order the plurality of candidate poses in an order of descending loss based on the plurality of losses, determine a trajectory based on the ordered plurality of candidate poses, and generate the movement command based on the trajectory.

9. The electronic device of claim 7, wherein the at least one processor is further configured to order the plurality of candidate poses based on a plurality of gradients corresponding to the plurality of losses.

10. A method of manipulating a target object, the method being executed by at least one processor and comprising:

obtaining a first image of the target object, wherein the first image is captured by a camera;

providing the first image and a target image to an artificial intelligence (AI) model to obtain relative pose information representing a relative 3-dimensional transformation about the first image with respect to the target image, wherein the relative 3-dimensional transformation includes relative translational components and relative rotational components, and wherein the target image is a pre-trained image for manipulating the target object;

generating a similarity value representing a similarity between the first image and the target image; and generating a control command comprising one from among a movement command and a manipulation command based on the similarity value;

wherein based on the similarity value being less than or equal to a threshold value, the control command comprises the movement command for moving a manipulator from a first position to a second position based on the obtained relative pose information representing the relative 3-dimensional transformation, and wherein based on the similarity value being greater than the threshold value, the control command comprises the manipulation command for manipulating the target object using the manipulator.

11. The method of claim 10, wherein based on the similarity value being less than or equal to the threshold value, the method further comprises:

controlling the manipulator to move to the second position based on the movement command, obtaining a second image of the target object, wherein the second image is captured by the camera, providing the second image and the target image to the AI model to obtain updated relative pose information about the second image with respect to the target image, based on the updated relative pose information, generating an updated similarity value corresponding to the second image and the target image, and generating an updated control command based on the updated similarity value, wherein based on the updated similarity value being less than or equal to the threshold value, the updated control command comprises an updated movement command for moving the manipulator from the second position to a third position, and wherein based on the updated similarity value being greater than the threshold value, the updated control command comprises the manipulation command for manipulating the target object using the manipulator.

12. The method of claim 10, wherein the manipulator comprises a robot arm having an end-effector configured to grasp the target object, wherein the camera is attached to the robot arm such that an orientation of the end-effector with respect to the camera is fixed, wherein the relative pose information indicates a relative pose of the robot arm with respect to the target object while the robot arm is located at the first position, wherein the manipulation command comprises a grasping command, and wherein the method further comprises, based on the grasping command, controlling the end-effector to grasp the target object.

13. The method of claim 12, wherein the target image is selected from among a plurality of target images using the AI model.

14. The method of claim 10, wherein the AI model comprises:

a first feature extraction network configured to obtain a first feature set based on the first image;

a second feature extraction network configured to obtain a second feature set based on the target image; and a feature transformation network configured to transform the first feature set to obtain a plurality of transformed first feature sets based on a plurality of candidate poses.

15. The method of claim 14, wherein the first feature extraction network, the second feature extraction network, and the feature transformation network are trained together, and wherein the first feature extraction network and the second feature extraction network share same weights.

16. The method of claim 14, wherein the method further comprises determining a plurality of losses between the second feature set and the plurality of transformed first feature sets, and wherein the relative pose information corresponds to a candidate pose associated with a smallest loss from among the plurality of losses.

17. The method of claim 16, wherein the generating of the movement command comprises:

ordering the plurality of candidate poses in an order of descending loss based on the plurality of losses, determining a trajectory based on the ordered plurality of candidate poses, and generating the movement command based on the trajectory.

18. A non-transitory computer-readable medium configured to store instructions which, when executed by at least one processor of a device for manipulating a target object, cause the device to:

obtain a first image of the target object, wherein the first image is captured by a camera, provide the first image and a target image to an artificial intelligence (AI) model to obtain relative pose information representing a relative 3-dimensional transformation about the first image with respect to the target image, wherein the relative 3-dimensional transformation includes relative translational components and relative rotational components, and wherein the target image is a pre-trained image for manipulating the target object, based on the obtained relative pose information, generate a similarity value representing a similarity between the first image and the target image, and generate a control command comprising one from among a movement command and a manipulation command based on the similarity value, wherein based on the similarity value being less than or equal to a threshold value, the control command comprises the movement command for moving a manipulator from a first position to a second position based on the obtained relative pose information representing the relative 3-dimensional transformation, and wherein based on the similarity value being greater than the threshold value, the control command comprises the manipulation command for manipulating the target object using the manipulator.

19. The electronic device of claim 1, wherein, to generate the control command, the instructions further cause the electronic device to:

perform a comparison between the similarity value and the threshold value, and determine whether to generate the movement command and the manipulation command based on a result of the comparison.

* * * * *